(12) United States Patent
Awad et al.

(10) Patent No.: US 12,414,085 B2
(45) Date of Patent: Sep. 9, 2025

(54) COMMUNICATIONS DEVICE, INFRASTRUCTURE EQUIPMENT AND METHODS

(71) Applicant: Sony Group Corporation, Tokyo (JP)

(72) Inventors: Yassin Aden Awad, Basingstoke (GB); Vivek Sharma, Basingstoke (GB); Shin Horng Wong, Basingstoke (GB); Yuxin Wei, Basingstoke (GB); Kazuyuki Shimezawa, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/743,157

(22) Filed: Jun. 14, 2024

(65) Prior Publication Data

US 2024/0357554 A1   Oct. 24, 2024

Related U.S. Application Data

(63) Continuation of application No. 17/413,592, filed as application No. PCT/EP2019/086016 on Dec. 18, 2019, now Pat. No. 12,022,438.

(30) Foreign Application Priority Data

Dec. 20, 2018   (EP) .................................... 18214944

(51) Int. Cl.
*H04W 72/543*   (2023.01)
*H04L 1/00*   (2006.01)
(Continued)

(52) U.S. Cl.
CPC .......... *H04W 72/02* (2013.01); *H04L 1/0003* (2013.01); *H04W 72/0446* (2013.01);
(Continued)

(58) Field of Classification Search
CPC ................. H04W 72/02; H04W 80/02; H04W 72/543; H04W 72/1268; H04L 1/003
See application file for complete search history.

(56) References Cited

U.S. PATENT DOCUMENTS 9,420,530 B1   8/2016   Duxbury et al.
10,834,751 B2 *  11/2020   Yi ....................... H04W 72/569
(Continued)

FOREIGN PATENT DOCUMENTS

CN   107251641 A   10/2017
CN   107852649 A   3/2018
(Continued)

OTHER PUBLICATIONS

3GPP TSG-RAN WG2#91bis, R2-154639 Title:LCIDS for extended MAC Ces for CA enhancements beyond 5 CCs (Year: 2015).*
Sequans, "Considerations for UL multiplexing with different reliability requirements", 3GPP TSG TAN WG1, Meeting #92bis, R1-1805158, Apr. 16-20, 2018, Sanya, China.
(Continued)

*Primary Examiner* — Faruk Hamza
*Assistant Examiner* — Abusayeed M Haque
(74) *Attorney, Agent, or Firm* — XSENSUS LLP

(57) ABSTRACT

A method for transmitting data by a communications device, the method comprising determining that a plurality of communications resources overlap, the communications resources being configured for the transmission of data by the communications device, in response to determining that the plurality of communications resources overlap, selecting communications resources comprising at least a portion of one or more of the plurality of communications resources, selecting data to be transmitted using the selected communications resources, and transmitting the selected data using the selected communications resources.

20 Claims, 11 Drawing Sheets

(51) Int. Cl.
   *H04W 72/02*      (2009.01)
   *H04W 72/0446*    (2023.01)
   *H04W 72/0453*    (2023.01)
   *H04W 72/23*      (2023.01)
   *H04W 80/02*      (2009.01)

(52) U.S. Cl.
   CPC ....... *H04W 72/0453* (2013.01); *H04W 72/23* (2023.01); *H04W 80/02* (2013.01)

(56) References Cited

U.S. PATENT DOCUMENTS

| | | | |
|---|---|---|---|
| 11,057,925 B2* | 7/2021 | Babaei | ................. H04L 5/0032 |
| 12,022,438 B2* | 6/2024 | Awad | .................... H04W 72/02 |
| 2009/0325578 A1 | 12/2009 | Li et al. | |
| 2010/0008326 A1 | 1/2010 | Albanese et al. | |
| 2015/0282148 A1 | 10/2015 | Le | |
| 2015/0334685 A1 | 11/2015 | Ji et al. | |
| 2016/0135239 A1 | 5/2016 | Khoryaev | |
| 2016/0278070 A1* | 9/2016 | Patel | ..................... H04W 72/23 |
| 2017/0367087 A1 | 12/2017 | Seo | |
| 2018/0098349 A1 | 4/2018 | Sun et al. | |
| 2018/0249358 A1* | 8/2018 | Ratasuk | .............. H04W 72/121 |
| 2018/0249518 A1* | 8/2018 | Nguyen | ................ H04W 72/20 |
| 2019/0036550 A1 | 1/2019 | Koike-Akino | |
| 2019/0098648 A1 | 3/2019 | Liu et al. | |
| 2019/0342865 A1 | 11/2019 | Shin et al. | |

FOREIGN PATENT DOCUMENTS

| | | | | |
|---|---|---|---|---|
| CN | 109041132 A | | 12/2018 | |
| KR | 20180007648 A | | 1/2018 | |
| TW | 201842796 A | | 12/2018 | |
| WO | WO-2016176965 A1 * | | 11/2016 | ............ H04W 72/04 |
| WO | 2017/144262 A1 | | 8/2017 | |
| WO | WO-2018093162 A1 | | 5/2018 | |
| WO | 2018/172382 A1 | | 9/2018 | |
| WO | 2018/225232 A1 | | 12/2018 | |
| WO | WO-2019050371 A1 * | | 3/2019 | ........... H04L 1/0013 |
| WO | WO-2019051874 A1 * | | 3/2019 | ........... H04L 1/0003 |
| WO | 2019/214074 A1 | | 11/2019 | |

OTHER PUBLICATIONS

3GPP TSG-RAN WG2#91bis, TDoc R2-154639 Title:LCIDs for extended MAC CEs for CA enhancement beyond 5 CCs (Year: 2015).

3GPP, "NR; NR and NG-RAN Overall Description", 3GPP TS 38.300 v. 15.2.0, Stage 2 (Release 15), Jun. 2018, pp. 1-87.

3GPP, "NR; Physical Layer Procedures for Data", (Release 15), 3GPP TS 38.214 V15.3.0, Sep. 2018, pp. 1-96.

3GPP, "Study on NR Industrial Internet of Things {IoT)", {Release 16), 3GPP TR 38.825 V16.0.0, Mar. 2019, pp. 1-33.

3GPP, "Study on NR Industrial Internet of Things {IoT)", Release 16, 3GPP TR 38.825 V0.0.1, Nov. 2018, pp. 1-12.

3GPP, "Study on Scenarios and Requirements for Next Generation Access Technologies", (Release 14), 3GPP TR38.913 V14.3.0, Jun. 2017, pp. 1-39.

Holma et al., "LTE for UMTS OFDMA and SC-FDMA Based Radio Access", John Wiley and Sons, 2009, pp. 25-27.

Huawei et al., "New SID on Physical Layer Enhancements for NR Ultra-Reliable and Low Latency Communication (URLLC)", 3GPP TSG-RAN#81, RP-182089, Sep. 10-13, 2018, 5 pages.

Asustek, "Connection Procedure Failure Caused by On-Demand SI Procedure", 3GPP TSG-RAN2 Meeting #104, R2-1818191, Nov. 12-16, 2018, 5 pages.

International Search Report and Written Opinion mailed on Mar. 3, 2020, received for PCT Application PCT/EP2019/086016, Filed on Dec. 18, 2019, 16 pages.

LS on Multiple Active Configured Grant Configurations, 3GPP TSG RAN WG2#104, R2-1818991, Nov. 12-16, 2018, 1 page.

Mediatek Inc., "Multiple Configured Grants for NR-U", 3GPP TSG-RAN WG2 Meeting #104, R2-1816683, Nov. 12-16, 2018, 3 pages.

Nokia et al., "Revised SID: Study on NR Industrial Internet of Things {IoT)", 3GPP TSG RAN meeting #81, RP-182090, Sep. 10-13, 2018, 5 pages.

Sony, "Discussion on Enhanced UL Grant-Free Transmissions", 3GPP TSG RAN WG1 Meeting #95, R1-1812746, Nov. 12-16, 2018, 4 pages.

Sony, "UL Intra-UE Pre-emption and Resource conflicts", 3GPP TSG-RAN WG2 Meeting #104, Spokane, USA, Nov. 12-16, 2018, R2-1817076, pp. 1-5.

* cited by examiner

COMMUNICATIONS DEVICE, INFRASTRUCTURE EQUIPMENT AND METHODS

CROSS-REFERENCE TO RELATED APPLICATIONS

The present application is a continuation of U.S. application Ser. No. 17/413,592, filed Jun. 14, 2021, which is based on PCT filing PCT/EP2019/086016, filed Dec. 18, 2019, which claims priority to EP 18214944.3, filed Dec. 20, 2018, the entire contents of each are incorporated herein by reference.

BACKGROUND

Field

The present disclosure relates to communications devices, infrastructure equipment and methods for the transmission of data by a communications device in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/ new radio access technology (RAT) systems [1], as well as future iterations/releases of existing systems, to efficiently support connectivity for a wide range of devices associated with different applications and different characteristic data traffic profiles.

Another example of such a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

The increasing use of different types of communications devices associated with different traffic profiles gives rise to new challenges for efficiently handling communications in wireless telecommunications systems that need to be addressed.

SUMMARY

The present disclosure can help address or mitigate at least some of the issues discussed above.

Embodiments of the present technique can provide a method for transmitting data by a communications device, the method comprising determining that a plurality of communications resources overlap, the communications resources being configured for the transmission of data by the communications device, in response to determining that the plurality of communications resources overlap, selecting communications resources comprising at least a portion of one or more of the plurality of communications resources, selecting data to be transmitted using the selected communications resources, and transmitting the selected data using the selected communications resources.

Embodiments of the present technique, which further relate to communications devices, infrastructure equipment, methods of operating infrastructure equipment and circuitry for communications devices and infrastructure equipment, allow for efficient and timely transmission of high priority data.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
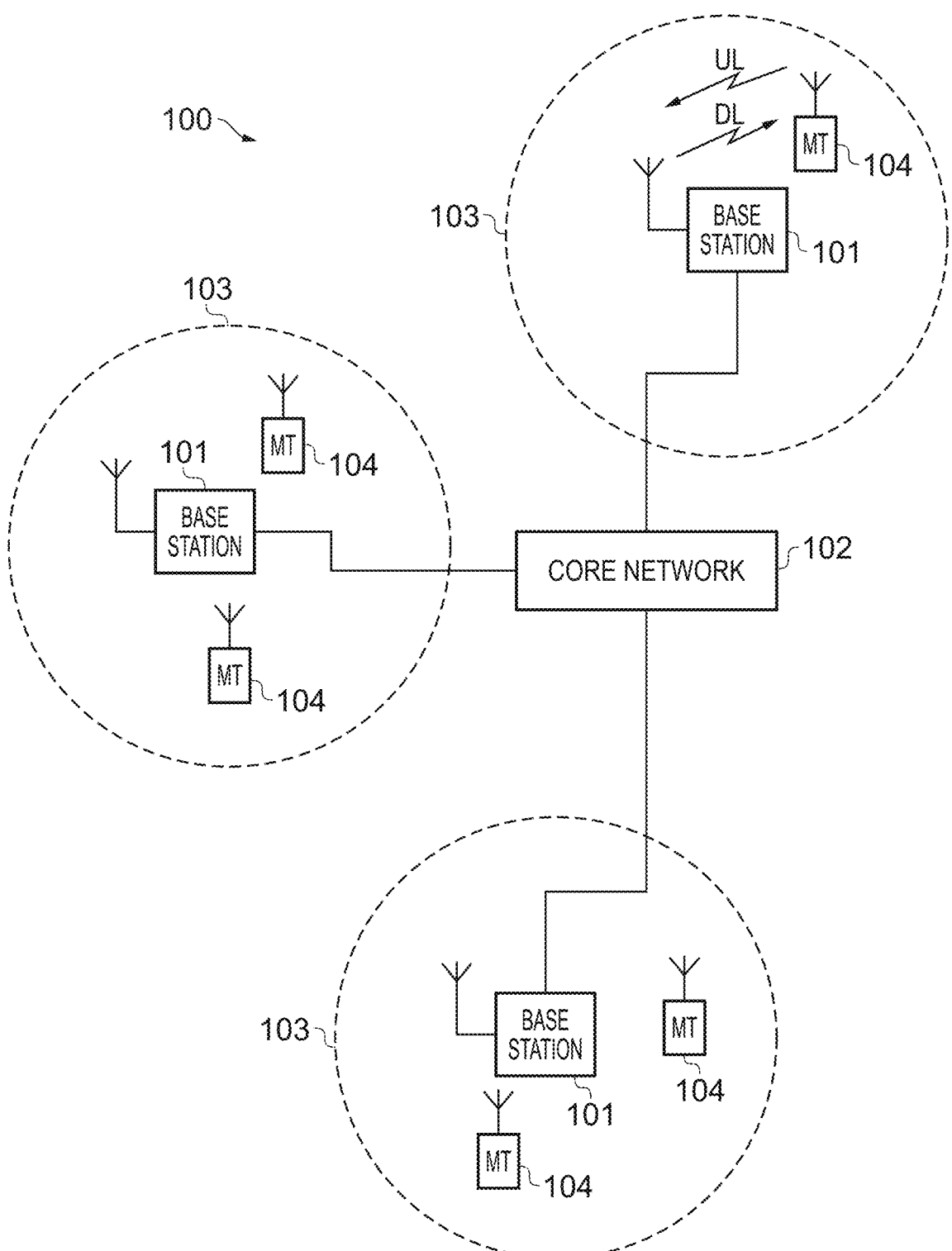
FIG. 1 schematically represents some aspects of a LTE-type wireless telecommunication system which may be configured to operate in accordance with example embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104, and within which a communications device may obtain service. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs and so forth. In this regard different terminology is often associated with different generations of wireless telecommunications systems for elements providing broadly comparable functionality. However, example embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

Figure 2:
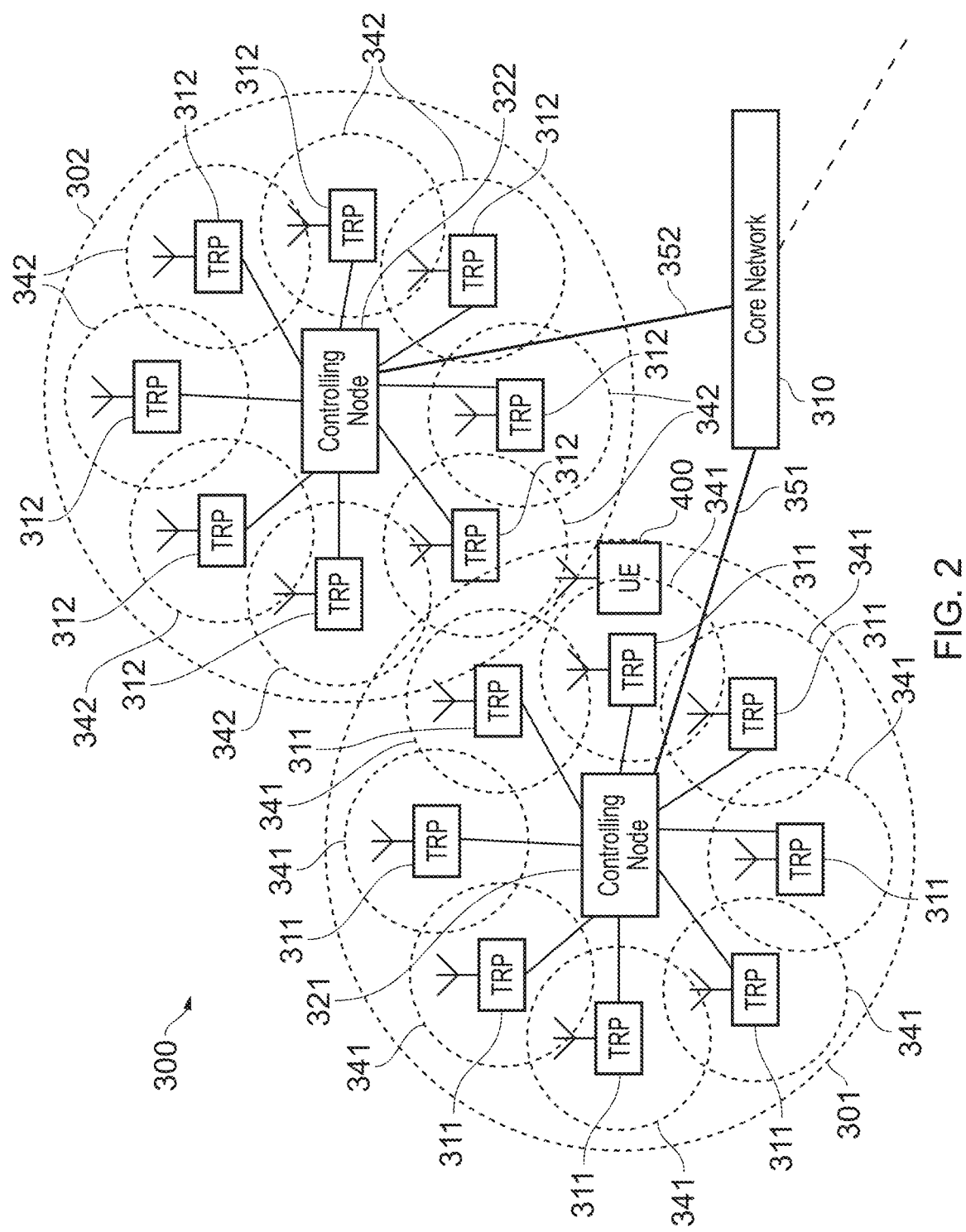
FIG. 2 schematically represents some example aspects of a new radio access technology (RAT) wireless communications network which may be configured to operate in accordance with embodiments of the present disclosure.

FIG. 2 is a schematic diagram illustrating a network architecture for a new RAT wireless communications network/system 300 based on previously proposed approaches which may also be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for communications devices connected to the network. Each distributed unit 311, 312 has a coverage area (radio access footprint) 341, 342 which together define the coverage of the respective communication cells 301, 302. Each distributed unit 311, 312 includes transceiver circuitry for transmission and reception of wireless signals and processor circuitry configured to control the respective distributed units 311, 312.

In terms of broad top-level functionality, the core network component 310 of the new RAT communications network represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device 400 is represented in FIG. 2 within the coverage area of the first communication cell 301. This communications device 400 may thus exchange signalling with the first controlling node 321 in the first communication cell via one of the distributed units 311 associated with the first communication cell 301. In some cases communications for a given communications device are routed through only one of the distributed units, but it will be appreciated in some other implementations communications associated with a given communications device may be routed through more than one distributed unit, for example in a data duplication scenario and other scenarios.

The particular distributed unit(s) through which a communications device is currently connected through to the associated controlling node may be referred to as active distributed units for the communications device. Thus the active subset of distributed units for a communications device may comprise one or more than one distributed unit (TRP). The controlling node 321 is responsible for determining which of the distributed units 311 spanning the first communication cell 301 is responsible for radio communications with the communications device 400 at any given time (i.e. which of the distributed units are currently active distributed units for the communications device). Typically this will be based on measurements of radio channel conditions between the communications device 400 and respective ones of the distributed units 311. In this regard, it will be appreciated that the subset of the distributed units in a cell which are currently active for a communications device will depend, at least in part, on the location of the communications device within the cell (since this contributes significantly to the radio channel conditions that exist between the communications device and respective ones of the distributed units).

In at least some implementations the involvement of the distributed units in routing communications from the communications device to a controlling node (controlling unit) is transparent to the communications device 400. That is to say, in some cases the communications device may not be aware of which distributed unit is responsible for routing communications between the communications device 400 and the controlling node 321 of the communication cell 301 in which the communications device is currently operating, or even if any distributed units 311 are connected to the controlling node 26 and involved in the routing of communications at all. In such cases, as far as the communications device is concerned, it simply transmits uplink data to the controlling node 321 and receives downlink data from the controlling node 26 and the communications device has no awareness of the involvement of the distributed units 311, though may be aware of radio configurations transmitted by distributed units 311. However, in other embodiments, a communications device may be aware of which distributed unit(s) are involved in its communications. Switching and scheduling of the one or more distributed units may be done at the network controlling node based on measurements by the distributed units of the communications device uplink signal or measurements taken by the communications device and reported to the controlling node via one or more distributed units.

In the example of FIG. 2, two communication cells 301, 302 and one communications device 400 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIG. 1 and FIG. 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 321, 322 and/or a TRP 311, 312 of the kind shown in FIG. 2 which is adapted to provide functionality in accordance with the principles described herein.

The embodiments of the present invention can find application with advanced wireless communications systems such as those referred to as 5G or New Radio (NR) Access Technology.

The elements of the wireless access network shown in FIG. 1 may be equally applied to a 5G new RAT configuration, except that a change in terminology may be applied as mentioned above.

Figure 3:
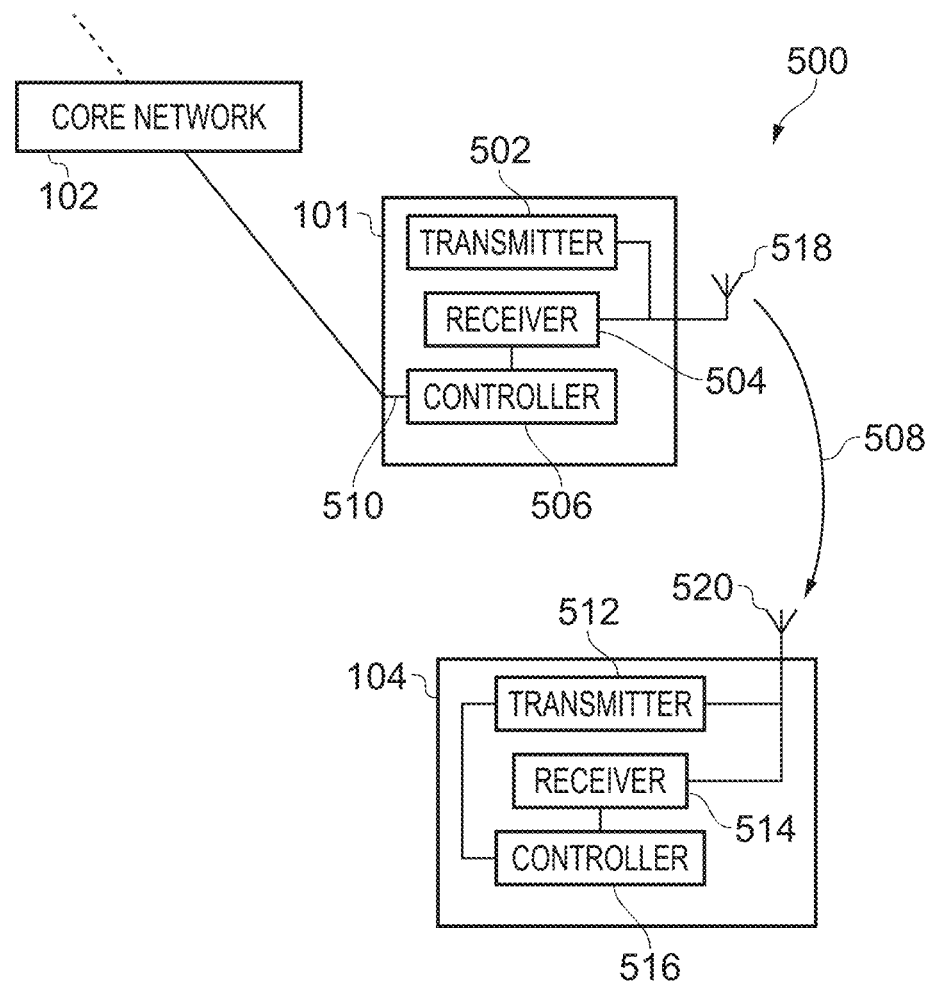
FIG. 3 schematically shows a telecommunications system according to an embodiment of the present disclosure.

FIG. 3 schematically shows a telecommunications system 500 according to an embodiment of the present disclosure. The telecommunications system 500 in this example is based broadly around an LTE-type architecture. As such many aspects of the operation of the telecommunications system/network 500 are known and understood and are not described here in detail in the interest of brevity. Operational aspects of the telecommunications system 500 which are not specifically described herein may be implemented in accordance with any known techniques, for example according to the current LTE-standards.

The telecommunications system 500 comprises a core network part 102 coupled to a radio network part. The radio network part comprises the infrastructure equipment (which may be an evolved-nodeB) 101 coupled, via a wireless access interface illustrated generally by arrow 508, to a communications device 104, which may also be referred to as a terminal device. It will of course be appreciated that in practice the radio network part may comprise a plurality of base stations serving a larger number of communications devices across various communication cells. However, only a single infrastructure equipment and single communications device are shown in FIG. 3 in the interests of simplicity.

As noted above, the operation of the various elements of the communications system 500 shown in FIG. 3 may be broadly conventional apart from where modified to provide functionality in accordance with embodiments of the present disclosure as discussed herein.

The infrastructure equipment 101 is connected to the core network 102 via an interface 510 to a controller 506. The infrastructure equipment 101 includes a receiver 504 connected to an antenna 518 and a transmitter 502 connected to the antenna 518. The receiver 504 and the transmitter 502 are both connected to the controller 506. The controller 506 is configured to control the infrastructure equipment 101 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 506 may comprise circuitry which is suitably configured/programmed to provide the desired functionality using conventional programming/configuration techniques for equipment in wireless telecommunications systems. The transmitter 502, receiver 504 and controller 506 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 101 will in general comprise various other elements associated with its operating functionality.

Correspondingly, the communications device 104 includes a controller 516 connected to a receiver 514 which receives signals from an antenna 520. The controller 516 is also connected to a transmitter 512 which is also connected to the antenna 520. The controller 516 is configured to control the communications device 104 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 516 may comprise circuitry which is suitably configured/programmed to provide the desired functionality using conventional programming/configuration techniques for equipment in wireless telecommunications systems. The transmitter 512, receiver 514 and controller 516 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 104 will in general comprise various other elements associated with its operating functionality, for example a power source, user interface, and so forth, but these are not shown in FIG. 3 in the interests of simplicity.

5G, URLLC and Industrial Internet of Things

Systems incorporating NR technology are expected to support different services (or types of services), which may be characterised by different requirements for latency, data rate and/or reliability. For example, Enhanced Mobile Broadband (eMBB) services are characterised by high capacity with a requirement to support up to 20 Gb/s. The requirements for Ultra Reliable & Low Latency Communications (URLLC) [1] services are for a reliability of $1-10^5$ (99.999%) or higher for one transmission of a 32 byte packet with a user plane latency of 1 ms [3]. In some scenarios, there may be a requirement for a reliability of $1-10^6$ (99.9999%) or higher. Massive Machine Type Communications (mMTC) is another example of a service which may be supported by NR-based communications networks.

In addition, systems may be expected to support further enhancements related to Industrial Internet of Things (IIoT) in order to support services with new requirements of high availability, high reliability, low latency, and in some cases, high-accuracy positioning.

Industrial automation, energy power distribution and intelligent transport systems are examples of new use cases for Industrial Internet of Things (IIoT). In an example of industrial automation, the system may involve different distributed components working together. These components may include sensors, virtualized hardware controllers and autonomous robots, which may be capable of initiating actions or reacting to critical events occurring within a factory and communicating over a local area network. The local area network may handle messages which are time sensitive and have strict time deadlines, and may thus be referred to as a time sensitive network (TSN). Some parts of this TSN network can be interconnected by 5G wireless system (5GS). The UEs/equipment in a TSN network may be expected to handle a mixture of the following different traffic [5]:

Multiple periodic streams, of different periodicities, of different priorities, for example multiple streams coming from different applications.

Aperiodic critical priority traffic that is the result of critical events, like alarms, safety detectors that need to be informed about the occurrence of a critical event Best effort type of traffic such as eMBB traffic, internet traffic, or any other traffic supporting factory operations.

Details of possible use cases and scenarios may be found in [5].

The UEs/equipment in the network may therefore be expected to handle a mixture of different traffic, for example, associated with different applications and potentially different quality of service requirements (such as maximum latency, reliability, packet sizes, throughput).

In order to permit a communications device to transmit data associated with multiple traffic classes in a timely manner, multiple configured grants/semi-persistent scheduling (SPS) grants may be required in order to provide more flexibility while avoiding excessive dynamic downlink control signalling.

It has been suggested [6] that multiple active configured grants allocating resources in a given bandwidth part (BWP) of a serving cell can be supported simultaneously at least for different services/traffic types and/or for enhancing reliability and reducing latency.

The inventors have appreciated that such allocations may result in difficulties for communications devices in preparing and transmitting transport blocks for transmission using resources thus allocated, taking into account different traffic priorities, latency and reliability requirements.

According to embodiments of the present disclosure, there is provided a method for transmitting data by a communications device, the method comprising determining that a plurality of communications resources overlap, the communications resources being configured for the transmission of data by the communications device, in response to determining that the plurality of communications resources overlap, selecting communications resources comprising at least a portion of one or more of the plurality of communications resources, selecting data to be transmitted using the selected communications resources, and transmitting the selected data using the selected communications resources.

As a result, the communications device may efficiently transmit high priority data making using of communications resources allocated by the wireless communications network.

Figure 4:
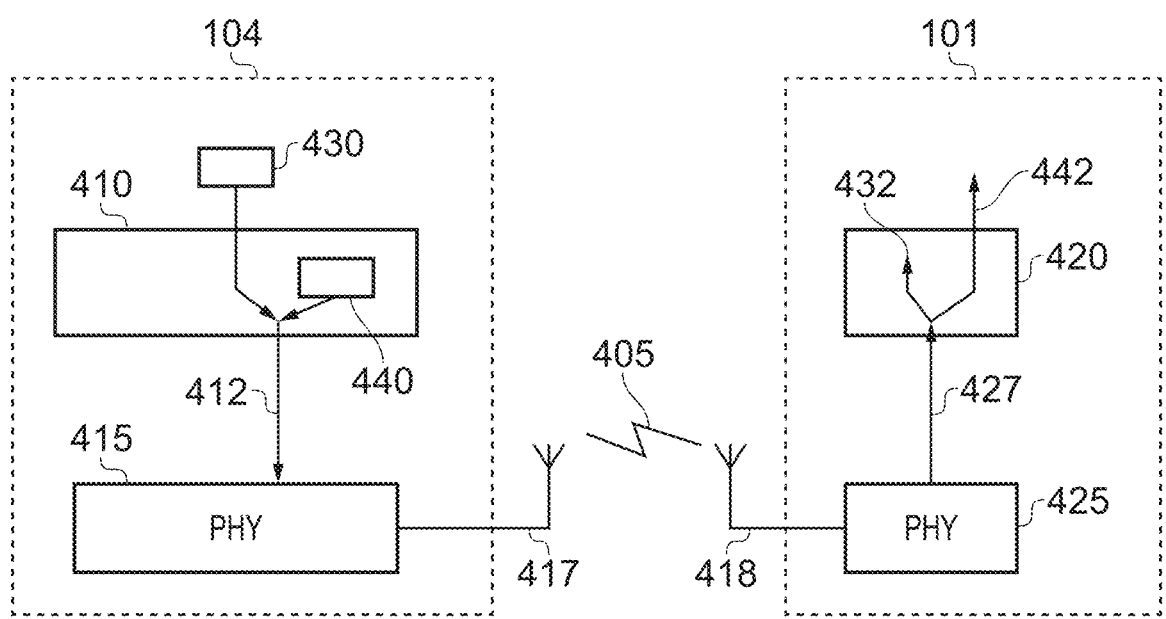
FIG. 4 illustrates an example of an arrangement of protocol layer entities within a communications device and an infrastructure equipment which may be configured in accordance with embodiments of the present technique.

FIG. 4 illustrates an example of an arrangement of protocol layer entities within the communications device 104 and the infrastructure equipment 101 which may be configured in accordance with embodiments of the present technique.

In the example of FIG. 4, protocol entities 410 and 420 are corresponding protocol entities at the same protocol layer, in the communications device 104 and the infrastructure equipment 101 respectively. With respect to the protocol entity 410, the data 430 which is received from a higher layer protocol entity (not shown) at the protocol entity 410 in the communications device 104 for transmission may be considered as user plane data. The protocol entity 410 may process the user plane data 430 in some manner (e.g. by segmentation, encoding, forming into protocol data units, associating with sequence numbers, etc.) before passing it to lower layers for transmission.

In contrast, control plane data 440 is generated by the protocol entity 410 in the communications device 104 for transmission to the peer protocol entity 420 of the infrastructure equipment. The protocol entity 410 may process the control plane data in a manner similar to that used for user plane data, before either passing it to lower layers for any further processing and transmission.

FIG. 4 shows physical layer (PHY) protocol entities 415, 425 in the communications device 104 and infrastructure equipment 101 respectively. The PHY protocol entities 415, 425 may be at the lowest level of the protocol hierarchy and may generate signals representing the data for transmission on the wireless access interface 405 and may decode signals representing the data received on the wireless access interface 405. The signals representing the data may be transmitted and received via one or more antennae 417, 418.

At the communications device 104, both the control plane data 440 and the user plane data 430 are passed to the lower layers, and ultimately to physical layer (PHY) protocol entities 415, 425. The control plane data 440 and the user plane data 430 are passed to the lower layers by the protocol entity 410 as indicated by the single arrow 412.

At the infrastructure equipment 104, the protocol entity 420 which is the peer entity of the protocol entity 410 receives the control plane data 440 and the user plane data 430 from a protocol entity at a lower layer. Both may be passed by the PHY protocol entity 425 to higher layers and ultimately to the peer protocol entity 420.

At the peer protocol entity 420, it is determined that the control plane data 440 is destined for the protocol entity 420, and is therefore processed in accordance with the protocol rules by which the protocol entities 410 and 420 operate, without being passed to higher layer protocol entities, as indicated by the arrow 432. The user plane data 430 is determined to be destined for a higher layer protocol entity, and is therefore processed in accordance with the protocol rules by which the protocol entities 410 and 420 operate in respect of user plane data; for example, this may involve performing decoding, reassembly, and/or generating acknowledgement information, before being passed to higher layer protocol entities, as indicated by the arrow 442.

In the example of FIG. 4, the protocol entity 420 which is the peer of the protocol entity 410 of the communications device 104 is shown as being within the infrastructure equipment 101. However, as described above, some protocol layers may be terminated (that is, have the peer entity corresponding to the protocol entity of the communications device 104) at other equipment within, or outside of, the wireless communications network.

MAC Transport Block

Data may be transmitted by the communications device 104 using uplink communications resources using a medium access control (MAC) transport block (TB). Each MAC TB is constructed at a MAC protocol layer (which may be the protocol entity 410 of FIG. 4) in response to determining that uplink communications resources are, or will be, scheduled for the communications device and that data is available for uplink transmission.

Once the MAC TB is constructed, it may be passed from the MAC protocol layer to the PHY protocol entity (such as the PHY protocol entity 415 illustrated in FIG. 4) for transmission on the wireless access interface to the infrastructure equipment 101.

In order to satisfy latency requirements for certain data, there may be corresponding requirements on the communications device 104 to be able to form, ready for transmission, a MAC TB containing the data within a certain duration (e.g. $TB\_Form\_Delay_{MAX}$) starting from when the data is made available. In other words, there may be a requirement that the communications device 104 shall be ready to start transmitting the transport block comprising the data, provided that data was available at the MAC protocol layer for encoding no later than $TB\_Form\_Delay_{MAX}$ prior to the start of the transmission time.

$TB\_Form\_Delay_{MAX}$ may be referred to as a physical uplink shared channel (PUSCH) preparation time $N_2$ and may be expressed in terms of orthogonal frequency division multiplexing (OFDM) symbols. For example, values of $TB\_Form\_Delay_{MAX}(N_2)$ are specified for NR in 3GPP TS 38.214 [4], section 6.4.

Data for inclusion within a MAC TB may be associated with one or more logical channels, each of which may be associated with quality of service requirements. Each of the one or more logical channels may be associated with a logical channel priority.

In some embodiments, where a MAC TB is formed and data from multiple logical channels is available for transmission, data associated with a logical channel having a higher associated logical channel priority may be included in precedence to data associated with a logical channel having a lower associated logical channel priority.

Grant Based and Grant Free Resources

In a conventional uplink transmission, when data arrives from upper protocol layers at a buffer at the medium access control (MAC) protocol layer of the communications device, the communications device may transmit, in response, a Scheduling Request (SR) to the network if the communications device has no uplink transmission/resources scheduled. The communications device may transmit a buffer status report (BSR), indicating an amount of data in the MAC layer buffer(s). In response to receiving the SR or BSR, the network (for example, the infrastructure equipment 101) may send an Uplink Grant carried by downlink control information (DCI) to the communications device 104. The DCI may be transmitted on a physical downlink control channel (PDCCH).

The Uplink Grant may comprise an indication of uplink communications resources which are allocated (or, in other words, scheduled) for the communications device to transmit its uplink data. The uplink communications resources may be on a physical uplink shared channel (PUSCH). A resource allocation of this type, where resources are allocated on an ad-hoc, one-off basis, may be known as a grant based resource or 'dynamic grant' (DG). Grant based resources are suitable for services where the data arrives in variable amounts, and/or is aperiodic, even if the data traffic arrival follows a somewhat predictable traffic pattern. DGs may be signalled at the MAC layer.

On the other hand, grant free resources are a set of periodically repeating uplink communications resources which are semi-statically configured by the network for the use of the communications device for uplink transmission. Such resources may also be referred to as a 'configured grant' (CG). Grant free resource allocation (which may also be referred to as 'semi-persistent scheduling' (SPS)) is particularly suitable for services that generate periodic data traffic, where the amount generated is broadly constant over time. CGs may be signalled at a radio resource control (RRC) layer.

Grant free resources can improve the efficiency with which communications resources are used, since there is no need for either a SR or uplink grant to be transmitted in respect of each uplink data transmission.

Communications resources may thus be configured for a communications device in accordance with quality of service requirements associated with particular services. Where a single communications device generates data for transmission which comprises data associated with different quality of service requirements, for example because it is associated with different services, the communications device may be configured with multiple resource grants. These multiple resource grants may comprise zero, one or more dynamic grants, and zero, one or more configured grants.

Allocated communications resources may be those which are selected for the transmission of data by the communications device. In the case of a dynamic grant, the communications resources indicated by the dynamic grant are allocated for the communications device, either implicitly or explicitly. In the case of configured grants, the communications device may select (i.e. allocate) one or more instances of the communications resources corresponding to the configured grant for a transmission by the communications device.

A communications device may thus have multiple active grants. Communications resources configured by these grants may in some instances coincide, for example in the time domain, the frequency domain, or both.

A resource allocation (whether by means of a dynamic grant or a configured grant) may be associated with modulation and coding scheme (MCS) parameters. The MCS parameters may be selected by the infrastructure equipment 101 in order to satisfy one or more of reliability, data throughput and latency requirements associated with the data to be transmitted using the resource allocation.

As will be appreciated, in general, the selection of MCS parameters represents a trade-off between, on the one hand, higher throughput and lower latency, and on the other, greater reliability (i.e. higher probability of the receiver of the data decoding the received data without errors).

Figure 5:
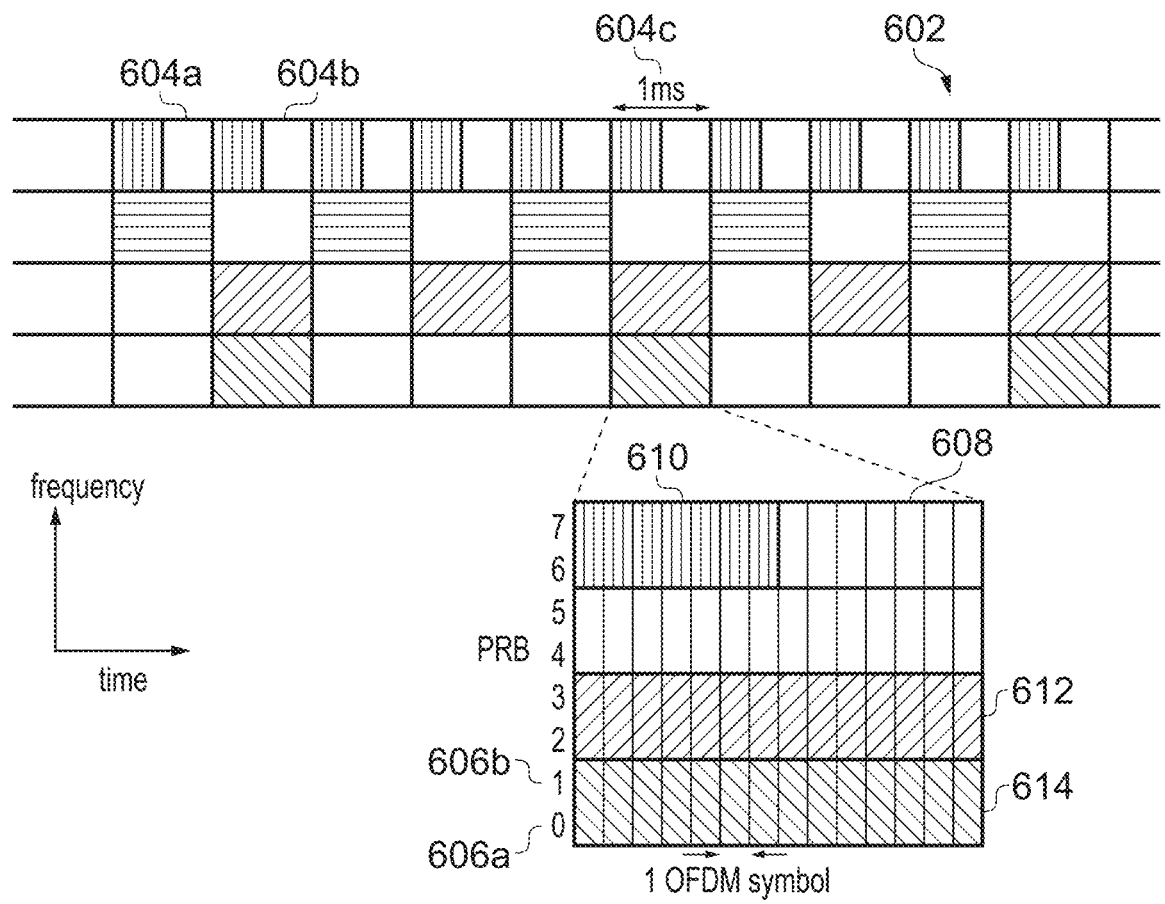
FIG. 5 illustrates a scenario in which communications resources associated with multiple configured grants can be allocated to the same communications device.
Figure 5:
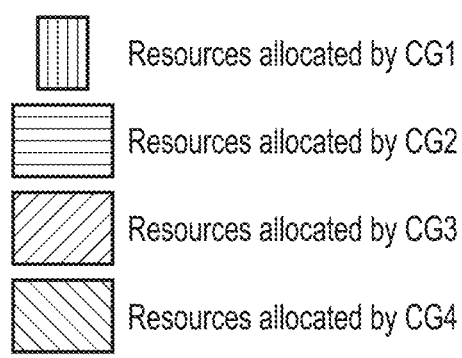

An example of how communications resources associated with multiple configured grants can be configured for the same communications device is shown in FIG. 5.

In the example of FIG. 5, the communications device 104 is configured with communications resources on an uplink portion 602 of a wireless access interface by means of four separate configured grants, labelled CG1-CG4. As shown in FIG. 5, the uplink resources of the wireless access interface are divided in time into a series of timeslots 604*a*, 604*b*, etc. Each timeslot comprises 14 OFDM symbol periods 608.

In the frequency domain, uplink resources of the wireless access interface are divided into physical resource blocks (PRBs) 606*a*, 606*b*, etc., and are numbered in this example from 0 to 7.

CG1 comprises a grant of resources using PRBs 6 and 7 during the first 7 OFDM symbols in each 1 ms timeslot. CG2 comprises a grant of resources during all of the OFDM symbols on PRBs 4 and 5 in alternate timeslots. During the timeslots in which CG2 allocates no resources, CG3 and CG4 comprise resources on PRBs 0 and 1, and 1 and 2, respectively, on all OFDM symbols.

The resources allocated by CG1-CG4 have periodicities of, respectively, 0.5 ms, 2 ms, 2 ms and 4 ms.

As shown in the expanded view of the timeslot 604*c* in FIG. 5, conflicts between resources associated with different CGs may arise. That is, communications resources associated with one CG may overlap in time, frequency or both with resources associated with a different CG.

In the timeslot 604*c* illustrated in FIG. 5, first communications resources 610 associated with CG1 conflict with second communications resources 612 associated with CG3 and third communications resources 614 associated with CG4.

In the example of FIG. 5, the conflicting communications resources are all configured by CGs. However, in some embodiments, conflicts may arise between resources configured by a CG and a DG, or between resources configured (and thus allocated) by two DGs. In some embodiments of the present technique, the communications resources may be configured and allocated by any suitable means.

In some embodiments of the present disclosure, conflicts may be identified and/or resolved with respect to configured communications resources, irrespective of whether those communications resources are allocated for transmission by the communications device. In some such embodiments, once the conflict has been resolved in accordance with the processes disclosed herein, the selected communications resources may be subsequently allocated (if not already allocated, for example by means of a dynamic grant) for data transmission by the communications device.

In some embodiments of the present disclosure, conflicts are identified and resolved with respect to communications resources allocated for transmission by the communications device. As described above, communications resources may be allocated by the infrastructure equipment 101 by means of a dynamic grant, or may be allocated by the communications device 104 from communications resources configured by a configured grant.

The following description refers generally to allocated communications resources, however as indicated above, in some embodiments the same processes and principles may be applied to configured resources, irrespective of whether they have been allocated. In some embodiments, for example where some of the relevant communications resources may be configured by means of configured grants and others by dynamic grants (which are therefore implicitly allocated), some communications resources may be configured but not allocated and some may be both configured and allocated.

Where allocated communications resources overlap in at least the time domain, the communications device 104 may be required to have ready for transmission a transport block for each of the corresponding communications resources. For example, at the beginning of the timeslot 604*c* shown in an expanded view in FIG. 5, it may be required that the communications device 104 has formed (or is capable of forming) three transport blocks ready for transmission on, respectively, first communications resources 610, second communications resources 612, and third communications resources 614.

In addition or alternatively, the communications device 104 may be required, as a result of the conflicting allocated communications resources, to be able to transmit on multiple frequency resources simultaneously, where those frequency resources may or may not be contiguous. In the example of the timeslot 604c shown in FIG. 5, during the first 7 OFDM symbols of the timeslot, the communications device 104 is required to transmit on PRBs 0 to 3 and PRBs 6 and 7 simultaneously.

Such requirements may be challenging, if not impossible, for the communications device 104. for example, the communication device 104 may not be capable of transmitting at an appropriate power for all three MAC TBs simultaneously. This may be because the communications device 104 lacks sufficient power headroom for the required transmissions. In addition or alternatively, it may not be possible to meet timing requirements described above associated with the formation of transport blocks, if these requirements are to be satisfied in respect of each of multiple transport blocks having a same (or even closely separated) transmission start time. For example, where the time periods having duration $TB\_Form\_Delay_{MAX}$ prior to the respective start of two or more transmissions overlap, a communications device may not be able to form all of the transport blocks while satisfying the $TB\_Form\_Delay_{MAX}$ constraint in respect of all of the blocks.

Embodiments of the present technique may provide solutions to address the above problem.

In general in the following description a conflict may be characterised as being in respect of two resource allocations or grants, each allocating communications resources which are conflicting. However, it will be apparent that the scope of the present disclosure is not so limited, and may apply to conflicts arising from three or more resource allocations, as in the example of FIG. 5.

In some embodiments, such conflicts may be resolved jointly; that is, consideration of each of the conflicting communications resources, corresponding data and/or MCS parameters may be made substantially in parallel, and references in the following description to 'two conflicting communications resources' (or similar) may be understood as referring to 'all conflicting communications resources'.

In some embodiments, conflicts may be resolved by resolving a pairs of conflicting communications resources and by repeatedly carrying out the following processes in respect of each pair of conflicting communications resources. The result of such a resolution may form an input as a single communications resource to a subsequent iteration of the process.

References to 'data corresponding to communications resources' and the like may refer to data which would have been selected for transmission using those communications resources in the absence of any conflict. In particular, the data may be associated with quality of service requirements which may be satisfied by transmitting using those communications resources. In particular, where the communications resources are allocated by means of a configured grant, the grant may provide resources which are intended to satisfy the quality of service requirements of the 'corresponding data'. As such, the grant (and the resulting communications resources) and the corresponding data may all be associated with a particular service or application.

Figure 6:
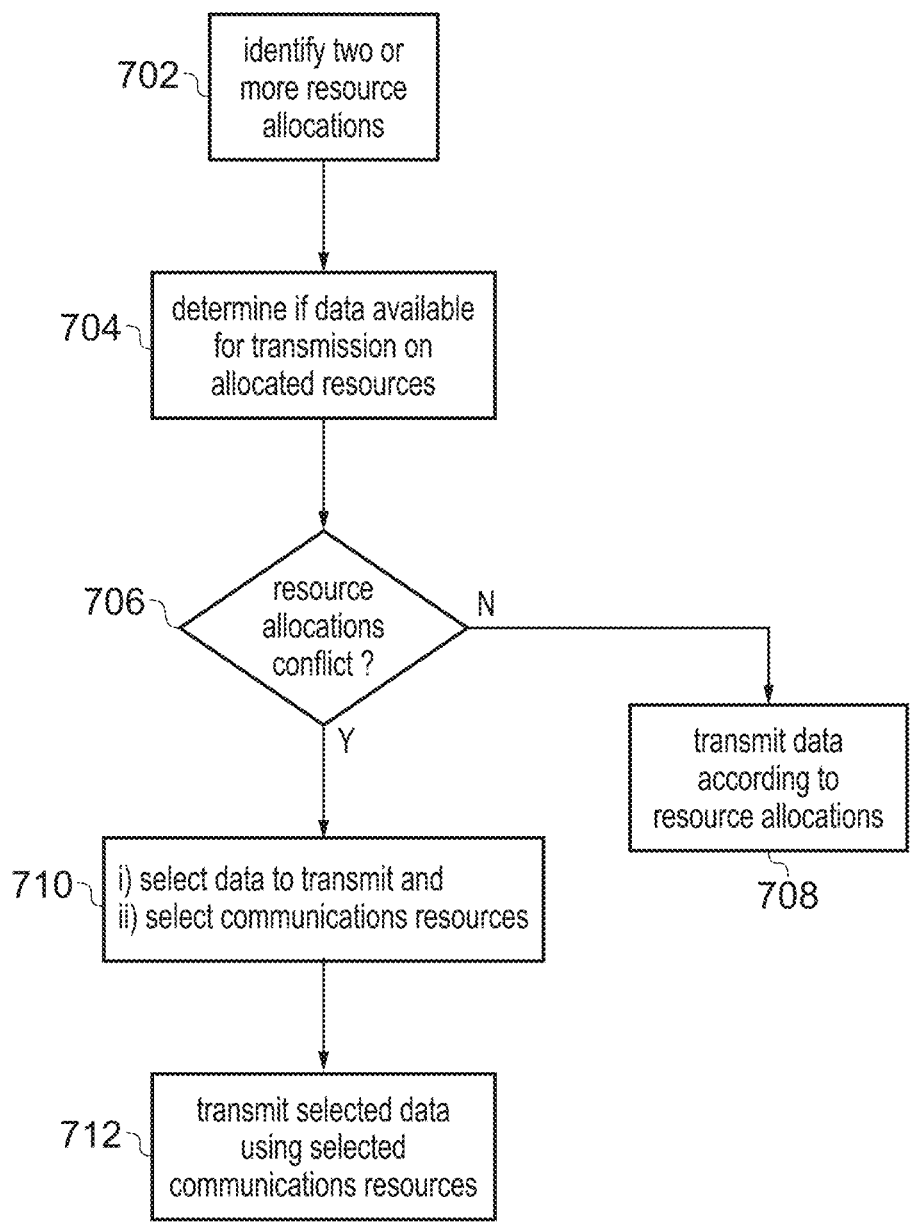
FIG. 6 illustrates a flow chart for a process for transmitting data by the communications device according to embodiments of the present technique.

FIG. 6 illustrates a flow chart for a process for transmitting data by the communications device 104 according to embodiments of the present technique.

The process starts at step 702 in which the communications device identifies two or more resource allocations, each comprising communications resources allocated on the wireless access interface for the transmission of data by the communications device 104. Each of these resource allocations may be allocated by means of a dynamic grant or a configured grant.

The identified resource allocations may be identified based on one or more particular time slot(s) during which the corresponding communications resources are allocated. The one or more particular time slot(s) may begin approximately $TB\_Form\_Delay_{MAX}$ or more from when the process is carried out.

In step 704, the communications device 104 determines whether it has data for transmission via two or more of the plurality of resource allocations identified in step 702. The data for transmission may be received from one or more applications, or from one or more protocol entities.

The process continues with step 706, in which the communications device 104 determines whether a conflict exists in respect of the plurality of resource allocations. Examples of the evaluation which may be carried out at this step are described below.

If no conflict is determined to exist in respect of the plurality of resource allocations, control passes to step 708, and the communications device 104 transmits some or all of the available data for transmission using one or more of the corresponding resource allocations.

For example, the communications device may transmit data associated with a particular quality of service requirement using one or more resource allocations provided for the purpose of satisfying that quality of service requirement.

In some embodiments, in step 708, a MAC transport block may be formed for each resource allocation in which data is to be transmitted.

In some embodiments, in step 708, data is transmitted using a resource allocation in accordance with modulation and coding scheme (MCS) parameters associated with the resource allocation.

If, at step 706, a conflict is determined to have exist in respect of two or more identified resource allocations, then control passes to step 710.

In step 710, the communications device 104 selects communications resources to be used to transmit data and, optionally, selects the data to transmitted. In some embodiments, the selected communications resources are all or a subset of those resource allocations identified at step 702. In some embodiments, the selected communications resources may comprise communications resources which are not associated with (i.e. allocated by) the resource allocations identified at step 702.

At step 710, the communications device 104 may further select MCS parameters for each MAC transport block to be transmitted using the selected resources. Further details of steps which may be carried out by the communications device 104 during step 710 and/or step 712 are described below in respect of FIG. 8.

Control then passes to step 712.

At step 712, the communications device 104 may form one or more MAC transport blocks based on the selected data, for transmission using the selected communications resources. The MAC transport block(s) may be formed in accordance with the selected MCS parameters.

At step 712, the communications device 104 transmits the data selected at step 710 using the communications resources selected at step 710. At step 712, the communications device 104 may additionally transmit control information to the infrastructure equipment 101 to indicate one or more of the selected data, the selected communications resources and the selected MCS parameters. Some or all of the control information may be encoded within a MAC transport block.

The process illustrated in FIG. 6 may repeat periodically (for example, every timeslot).

In some embodiments, one or more of the steps shown in FIG. 6 may be omitted and/or the steps may be performed in a different order. For example, in some embodiments, step 706 may be carried out irrespective of any identification of available data; as such, step 704 may be omitted or carried out in parallel with, or after, step 706.

In some embodiments, one or more of the steps may be performed separated in time. For example, where a conflict is identified based on configured grants, the identification of the conflict at step 702 and the determination as to whether configured resources conflict at step 706 may be performed prior to the determination of available data at step 704. Accordingly, in some embodiments, the selection of communications resources in step 710 may be carried out prior to the selection of data for transmission in step 710. In particular, in some embodiments, steps 702, 706 and part ii) (selection of communications resources) of step 710 may be carried out prior to data being available for transmission.

As described above, in step 706 the communications device 104 determines whether a conflict exists in respect of two or more identified resource allocations, as will now be described in further detail.

According to some embodiments of the present technique, the communications device 104 determines that two or more resource allocations may result in a conflict if it is not possible for the communications device 104 to form and/or to transmit respective transport blocks for transmission using all of the two or more resource allocations.

In some embodiments, a conflict is found to exist if the communications resources associated with the resource allocations overlap in time, for example because the communications device 104 can only transmit one transport block at a time, due to the capabilities of the communications device 104 and/or constraints imposed by specifications or other requirements and/or for any other reasons. For example, in the timeslot 604c shown in expanded form in FIG. 5, the resources 610, 612, 614 allocated by CG1, CG3 and CG4 within the timeslot 604c result in a conflict. As such, the communications device 104 determines there to be a conflict in respect of the corresponding resource allocations.

In some embodiments, a conflict may be determined to exist based on processing time requirements for forming transport blocks, such that a maximum permitted time requirement between receiving data and being ready to begin transmission of a corresponding transport block using a respective allocation cannot be satisfied in respect of one or more of the allocations.

Figure 7:
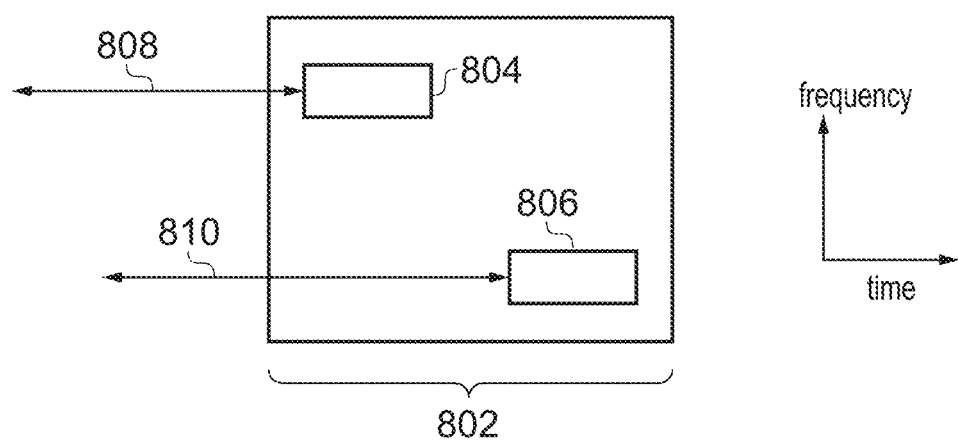
FIG. 7 illustrates communications resources which may be determined to result in a conflict, in accordance with embodiments of the present technique.

FIG. 7 shows an example timeslot 802 in which communications resources 804 and 806 are allocated for the transmission of data by the communications device 104. The communications resources 804, 806 do not overlap in time. Periods corresponding to the respective durations of TB_Form_Delay$_{MAX}$ immediately preceding the communications resources 804, 806 are shown by arrows 808, 810 respectively.

In a worst case scenario the data is made available at the last possible instant. In such a scenario, the time periods 808, 810 within which the communications device 104 may be required to form two transport blocks for transmission using the communications resources 804, 806 do overlap.

In such a scenario, the communications device 104 may therefore determine that a conflict exists in respect of the communications resources 804 and 806, even though the communications resources themselves do not overlap in time. This may be because, for example, the processing capabilities of the communications device 104 are insufficient for it to be able to form a MAC TB in less time than TB_Form_Delay$_{MAX}$, and/or to form multiple MAC TBs in parallel, as would be required in the scenario illustrated in FIG. 7.

TB_Form_Delay$_{MAX}$ may be the same for all resources (and therefore for all MAC TBs); however, in some embodiments (and as illustrated in FIG. 7), TB_Form_Delay$_{MAX}$ may differ. In such embodiments, the determination as to whether an overlap of processing time will occur may first require a determination of the TB_Form_Delay$_{MAX}$ delay applicable to each MAC TB to be transmitted using the potentially conflicting communications resources.

Additionally or alternatively, a conflict may be determined to exist if transmitting using all of the resources of the two or more resource allocations is not possible. For example, where two resource allocations overlap in time and use discontinuous frequency domain resources, it may not be possible for the communications device 104 to transmit using both resource allocations, because of a constraint associated with a maximum peak to average power ratio (PAPR) for the communications device 104 or there is not sufficient power to transmit more than one TB at the required power level.

For example, in the timeslot 604c illustrated in expanded form in FIG. 5, resources on PRBs 4 and 5 separate, in the frequency domain, the PRBs used for the resources allocated by CG1 and by CG3/CG4 during the overlap in the time domain. The communications device 104 is thus not permitted to transmit using the PRBs 4 and 5. The communications device 104 may therefore not be able to transmit using both the resources allocated by CG1 and the resources allocated by either (or both) of CG3 and CG4.

In some embodiments, the determination as to whether a conflict exists may take into account the outcome at step 704 of the process illustrated in FIG. 6. For example, where, at the time TB_Form_Delay$_{MAX}$ prior to the start of allocated communications resources, no data is available which is suitable for transmission using those resources, those resources may be disregarded in the evaluation of step 706. In other words, the evaluation at step 706 may consider only a resource allocation if data is available for transmission and, assuming the absence of any other resource allocations, would be transmitted using that resource allocation.

According to some embodiments of the present technique, in response to determining in step 706 that a conflict exists in respect of communications resources, the communications device 104 selects in step 710 communications resources to be used for transmission from at least a portion of the communications resources in respect of which the conflict is detected.

The communications device 104 may select in step 710 data to be transmitted using the selected communications resources, and/or may select MCS parameters to be used for the transmission of the selected data using the selected communications resources.

Details of the selection of communications resources, data to be transmitted, and MCS parameters in accordance with some embodiments of the present technique will now be described in more detail.

In some embodiments, the actions of the communications device 104 in step 710 may depend on the nature of the conflict(s) identified.

In some embodiments, as part of step 710, the communications device 104 determines one or more of the periodicity of the communications resources allocated by the respective resource allocations and/or the duration of a single instance of the communications resources allocated by the respective resource allocations.

Figure 8:
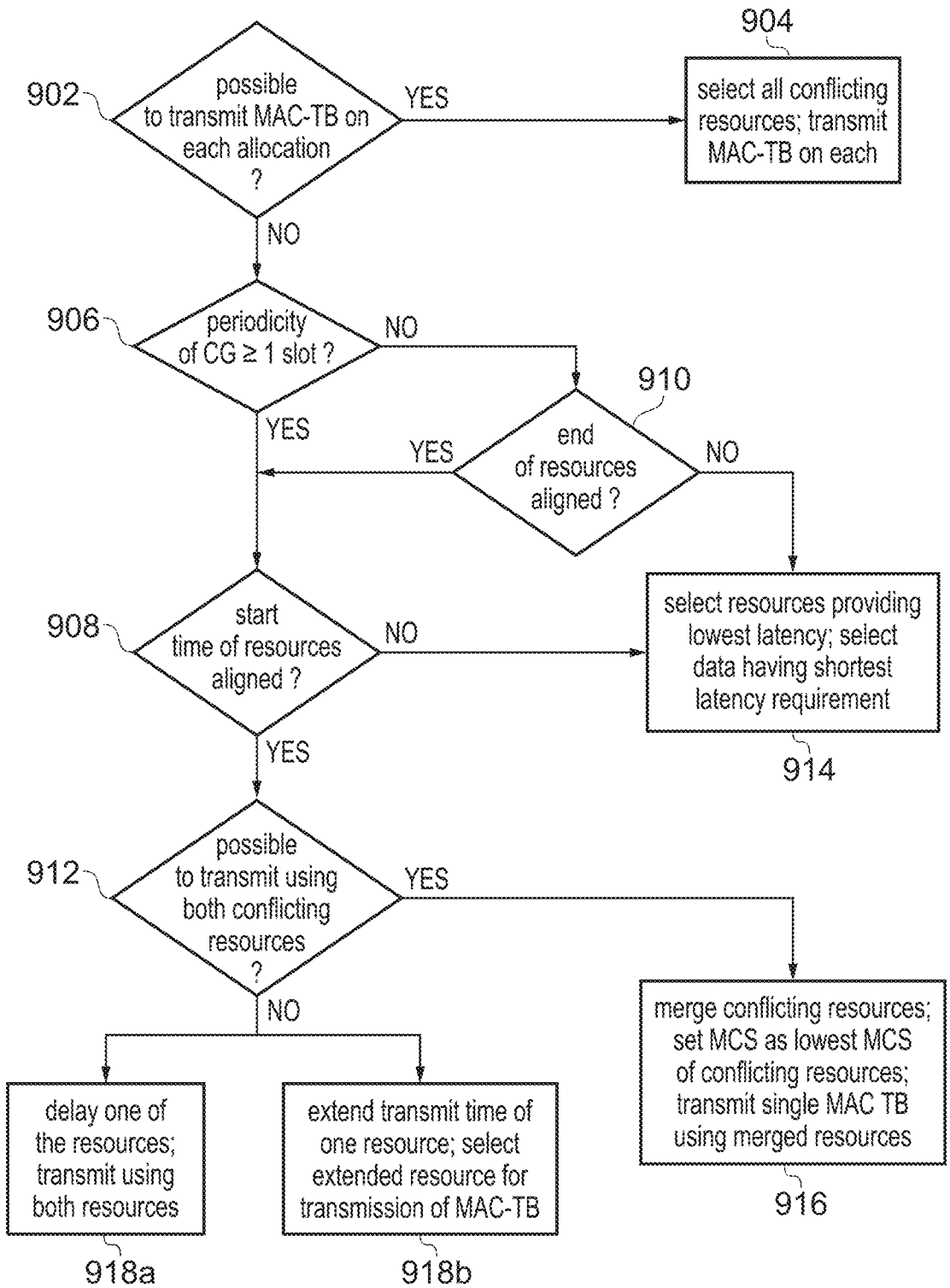
FIG. 8 shows a flow chart for a process for selecting communications resources for transmitting data by the communications device, in accordance with embodiments of the present technique.

FIG. 8 shows a flow chart for a process in accordance with embodiments of the present technique, which may correspond to some or all of the steps carried out at step 710 and/or step 712 of the process illustrated in FIG. 6.

The process starts at step 902, in which the communications device 104 determines whether, in spite of the identified conflict, it is possible to transmit separate MAC TBs using the conflicting communications resources.

This determination may be made based on one or more of the possibility to create the respective MAC TBs and the possibility to transmit using the physical resources allocated.

For example, if the data to be transmitted in one or both of the MAC TBs has been available sufficiently early (for example prior to $2 \times TB\_Form\_Delay_{MAX}$) prior to the start of the respective allocated communications resources, and the conflicting communications resources are contiguous in frequency, then the communications device 104 may determine that it is possible to transmit separate MAC TBs using each of the conflicting communications resources.

In some embodiments, it may not be possible to transmit using the conflicting communications resources while satisfying relevant PAPR requirements. As described above, this may be, for example, because the communications resources overlap in time and are not contiguous in frequency.

In some embodiments, a portion or all of one of the conflicting communications resources may overlap entirely with a portion or all of another of the conflicting communications resources. For example, a portion of one of the conflicting communications resources may be a subset of the other of the conflicting communications resources. Such an overlap may exist for example where one of the communications resources is allocated by means of a grant free allocation, and the other by means of a grant based allocation. In such a scenario, the communications device 104 may determine that it is not possible to transmit using both of the conflicting communications resources.

In some embodiments, it may be possible to transmit the two MAC TBs using different multiple input multiple output (MIMO) layers, in which case the communications device 104 may determine that it is possible to transmit separate MAC TBs using each of the conflicting communications resources.

If the result of the determination at step 902 is positive, then control passes to step 904, in which each of the conflicting communications resources are selected to be used for transmission of respective MAC TBs, independently of each other. In some embodiments, the communications resources may comprise different spatial MIMO layers to be used for the transmission of the respective MAC TBs.

The MAC TBs may be formed from data corresponding to the respective grant, e.g. based on a quality of service provided by the respective grant, and the quality of service associated with the data.

In step 904, the MCS parameters selected for each of the MAC TBs may be that applicable (e.g. as configured by the wireless communications network) to each corresponding grant.

If the result of the determination at step 902 is negative, then control passes to step 906.

In step 906, the communications device 104 determines the periodicity of the communications resources allocated by the respective resource allocations. The periodicity may be defined as the duration from the start time of an instance of communications resources allocated by a resource allocation to the start time of the next instance of communications resources allocated by the same resource allocation.

The communications device 104 may determine if the periodicity of both of the conflicted communications resources exceeds or is equal to a predetermined duration. In some embodiments, the predetermined duration is one timeslot (e.g. 1 millisecond). In some embodiments the predetermined duration corresponds to a maximum scheduling time unit in accordance with the operation of the wireless access interface.

If the communications device 104 determines that the periodicity of both of the conflicted communications resources is equal to or exceeds the predetermined duration, then control passes to step 908.

One or more of the conflicting communications resources may be non-periodic, for example because they are the result of one or more corresponding grant-based allocations. Control may pass to step 908 if all (if any) of the conflicting communications resources which are periodic are determined to have a periodicity which is greater than or equal to the predetermined duration, and control may pass to step 910 if the periodicity of any of the conflicted communications resources which are periodic does not exceed the predetermined duration.

If the communications device 104 determines in step 906 that the periodicity of one or both of the conflicted communications resources does not exceed the predetermined duration, then control passes to step 910.

At step 908, the communications device 104 determines whether the starting times of the respective communications resources are aligned.

As described above, $TB\_Form\_Delay_{MAX}$ may be different for the communications resources. This may be because, for example, one is associated with a grant free resource allocation and another is associated with a grant based allocation. In such embodiments, at step 908 the communications device 104 additionally or alternatively determines whether the start of the respective time periods starting $TB\_Form\_Delay_{MAX}$ prior to the start of the respective communications resources are aligned.

If the communications device 104 determines that the applicable starting times are aligned, then control passes to step 912; otherwise, control passes to step 914.

In step 910, the communications device 104 determines whether the end times of the respective communications resources are aligned.

If the end times are not aligned, then merging the communications resources for the transmission of a single MAC TB comprising the data which would otherwise have been sent on both of the communications resources may result in an unacceptable transmission delay for some of the data (specifically, that data which would otherwise have been transmitted using the communication resources which end first). Therefore it may be preferable not to merge communications resources (as is described below in the context of step 916) in such scenarios.

If, in step 910, the communications device 104 determines that the end times of the respective communications resources are aligned, then control passes to step 908. Otherwise, control passes to step 914.

In step 912, the communications device 104 determines whether it is possible to transmit a single MAC TB using both conflicting communications resources. This is different from the assessment in step 902, in which the assessment relates to the possibility of transmitting using separate MAC TBs, however, some of the same factors may be relevant.

In particular, for example, where two resource allocations overlap in time and use discontinuous frequency domain resources, it may not be possible for the communications device 104 to transmit using both resource allocations, because of a constraint associated with a maximum peak to average power ratio (PAPR) for the communications device 104.

Similarly, if a portion or all of one of the conflicting communications resources overlaps entirely with a portion or all of another of the conflicting communications resources, then the communications device 104 may determine that it is not possible to transmit using both resource allocations.

Alternatively, in some embodiments, if a portion or all of one of the conflicting communications resources overlaps entirely with a portion or all of another of the conflicting communications resources, then the communications device may nevertheless determine that the combined resources may be used for transmission.

Broadly, the determination in step 912 may in some embodiments depend on the capabilities of the physical layer of the communications device 104, and in particular its transmit functionality (including antennas, amplifiers and so on).

If it determined that it is possible for the communications device 104 to transmit a single MAC TB using both conflicting communications resources then control passes to step 916. Otherwise, control passes to step 918a or, in some embodiments, step 918b.

In step 916, the communications device 104 sets, as the selected communications resources, the union of communications resources associated with the two or more conflicting resource allocations and a single MAC TB may be formed for the transmission of data using the combined resources. For example, in the scenario illustrated in FIG. 5, communications resources allocated by CG3 and CG4 may be merged to form consolidated communications resources for the transmission of a single MAC TB.

In some embodiments, the communications device 104 may set, as the selected communications resources, the communications resources associated with the larger of the two or more conflicting resource allocations and a single MAC TB may be formed for the transmission of data using the selected resources. In some embodiments, this may be done if the conflicting communications resources comprise at least one allocated by means of a dynamic grant.

In some embodiments, the data selected to be transmitted using the combined resources may be all of the data which would have been sent using each of the conflicting communications resources, were there no conflict. In order to accommodate all of this data, the MCS parameters may be set accordingly. For example, the selected MCS parameters may be the MCS parameters selected from a predetermined set (e.g. according to a standard) providing the greatest transmission and reception reliability while permitting all of the selected data to be encoding within, and transmitted using, the single MAC TB, using the selected communications resources.

In some embodiments, in step 916, the selected MCS parameters may be set based on the MCS parameters applicable to the respective resource allocations. For example, the selected MCS parameters may be those of the MCS parameters associated with the conflicting communications resources which provide the greatest reliability. In some embodiments, a set of MCS parameters may be associated with an index to a table of MCS parameters, where MCS parameters associated with a higher MCS index permit more uncoded data to be transmitted within a given amount of communications resources, but at a relatively low reliability, and vice versa. In some embodiments, each of the conflicting communications resources are associated with an MCS index, and the selected MCS parameters are those associated with the lowest of these MCS indices.

In some embodiments, the selected data is selected from all of the data available for transmission at the start of the period beginning $TB\_Form\_Delay_{MAX}$ prior to the start of the merged communications resources. In such embodiments, the data may be selected according to a highest priority first (HPF) scheduling algorithm. In some embodiments, data having a particularly high priority (e.g. having the most stringent latency and reliability requirements, such as may be applicable for the transmission of a system critical alarm indication) may be selected, and no other data may be selected, in order to ensure that the selected data can be transmitted in accordance with its latency and reliability requirements. In some embodiments, the data may be selected in accordance with a highest priority first algorithm with reference to the logical channel priority associated with the logical channel(s) of the available data. Thus, in some embodiments, where the data selected to be transmitted using the combined resources is less than the data which would have been sent using each of the conflicting communications resources in the absence of a conflict, data may be selected for inclusion in the MAC TB by selecting data from, in order, the logical channel(s) having the highest logical channel priority, until the amount of data that can be included in the MAC TB has been selected.

In some embodiments, only data associated with a highest logical channel priority (of the logical channel priorities associated with all available data) is selected for inclusion in the MAC TB.

Figure 9:
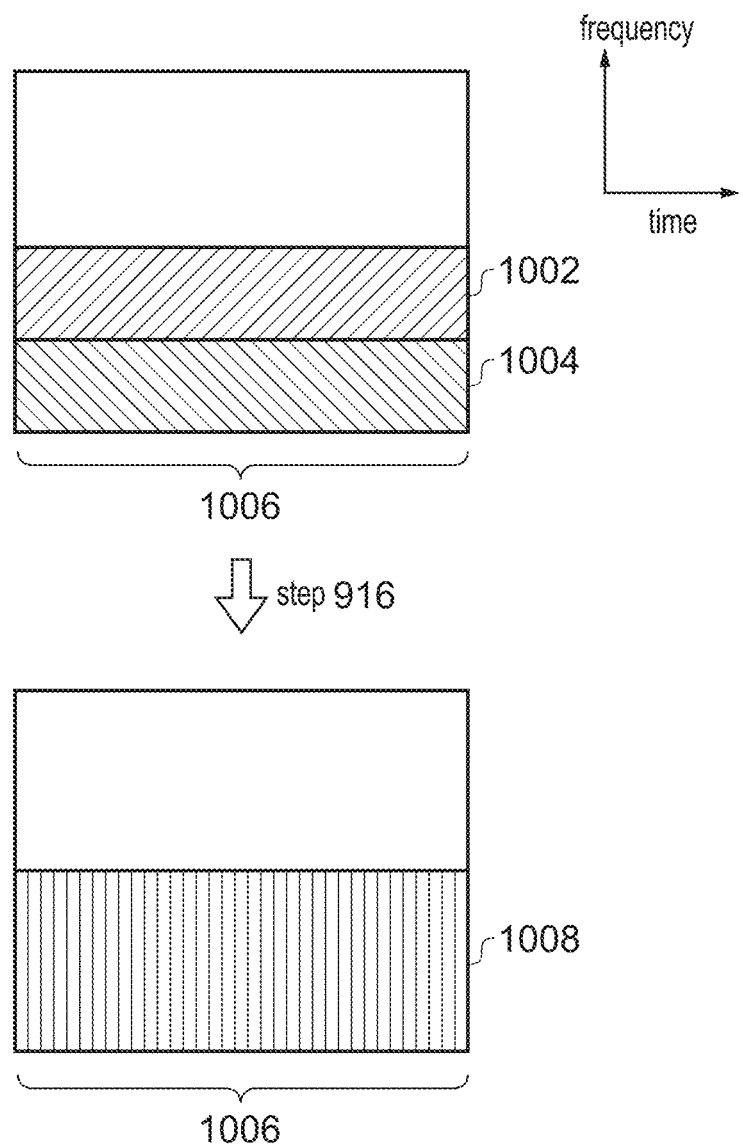
FIG. 9 illustrates a selection of communications resources in response to determining that a conflict exists, in accordance with embodiments of the present technique.

An example of the result of step 916 is illustrated in FIG. 9. In FIG. 9, within a timeslot 1006, first communications resources 1002 and second communications resources 1004 are determined to be conflicting, because they overlap in time.

As a result of performing step 916, the communications device 104 selects as the communications resources the combined communications resources 1008, which comprises both the first communications resources 1002 and second communications resources 1004.

The communications device 104 may further select, in step 916, the data to be transmitted using the selected communications resources 1008 as the data corresponding to both the first communications resources 1002 and second communications resources 1004.

The communications device may 104 further select, in step 916, the MCS parameters for the transmission of the selected data using the selected communications resources 1008 as being the MCS parameters, selected from a predetermined list, which permit the transmission of all of the selected data using the selected communications resources 1008 with the greatest reliability.

In some embodiments, the communications device 104 may select first the MCS parameters (for example, as the MCS parameters associated with one of the first communications resources 1002 and second communications resources 1004) and may then select an amount of data from that corresponding to both the first communications resources 1002 and second communications resources 1004, which can be transmitted using the selected communications resources 1008 in accordance with the selected MCS parameters.

Following step 916, the process ends.

The process may reach step 914 if it has been determined at step 908 that starting times associated with the conflicting communications resources are not aligned and/or (if the periodicity of one or both of the grants is less than the predetermined threshold) the end times associated with the conflicting communications resources are not aligned. This may imply that it is not possible to form a single MAC TB comprising the data that would otherwise (i.e. in the absence of a conflict) be transmitted using each of the conflicting communications resources, because the data to be transmitted may arrive at different times, and at least a portion of the data may not be available at the MAC protocol entity TB_Form_Delay$_{MAX}$ prior to the start of the communications resources which start first in time.

In step 914, the selected communications resources may be the communications resources associated with only one of the conflicting grants, or a portion thereof.

In some embodiments, in step 914, the selected communications resources may be selected according to the latency requirement(s) associated with each of the conflicting resource grant(s). For example, the selected communications resources may be those provided for the purpose of meeting the most stringent latency requirement.

In some embodiments, in step 914, the selected data may be similarly selected according to the latency requirements associated with each of the conflicting resource grants. For example, the selected data may be that which would, absent the conflict, be transmitted using the selected communications resources.

In some embodiments, in step 914, the selected communications resources are those of the conflicting communications resources which permit the transmission of the greatest quantity of data. The selected data may be selected in accordance with an HPF scheduling algorithm.

In some embodiments, a conflict may be determined to exist prior to it being determined whether there is data associated with each of the services associated with the conflicting resource grants. In some such scenarios, it may be determined (for example, in accordance with step 914 of the present process) to transmit low priority data using a first of the conflicting communications resources, prior to determining that higher priority data is also available for transmission using the conflicting communications resources. In some embodiments therefore, pre-emption may be used to pause or stop the transmission of the lower priority data in order to permit the higher priority data to be transmitted in accordance with the quality of service (and particularly, latency) requirements associated with the higher priority data.

In some embodiments, it may thus be necessary to perform one or more of the steps of the process illustrated in FIG. 6 more than once in respect of the same set of conflicting resources. For example, it may be necessary to repeat step 914 if new data arrives after an earlier selection of data and/or selection of communications resources has been made.

After step 914, the process ends.

The process may reach step 918a or step 918b if it has been determined that it is not possible to transmit using both of the conflicting communications resources.

In step 918a, one of the conflicting communications resources is, in effect, delayed in time. As such, the selected communications resources comprise one of the conflicting communications resources (unmodified) and a delayed instance of the other conflicting communications resources.

The delay applied to the one of the conflicting communications resources is sufficient for it to be possible for the communications device to transmit a MAC TB using each of the communications resources.

In some embodiments, the applied delay is the minimum sufficient to avoid any overlap in time of the communications resources. In some embodiments, the applied delay is an integer number of timeslots, such as one timeslot.

The selected data may be the data which would have been transmitted using the conflicting resource grants if there were no conflict, and the data may be formed into two MAC TBs, one for transmission using each of the conflicting communications resources.

The selected MCS parameters for the transmission of data on each of the conflicting communications resources may be the MCS parameters would have been used for the respective communications resource if there were no conflict.

In some embodiments, the process includes step 918a only if the periodicity of the grant corresponding to the delayed communications resources is greater than the length of the required delay. In other words, step 918a may be used only if the delayed communications resources would not then overlap in time with a later instance of the resource grant.

In some embodiments, the process may continue with step 918b instead of step 918a. As such, in some embodiments, the communications device 104 may determine whether it is possible to delay one of the conflicting communications resources sufficient to avoid an overlap in time with the other conflicting communications resources, without the delayed communications resources encroaching on a later instance of the communications resources allocated by the same resource grant.

In some embodiments of the present technique, the process follows step 918b instead of step 918a.

In step 918b, the selected data is set as all of the data which would have been transmitted using both of the conflicting communications resources had there been no conflict (i.e. if it were possible for the communications device 104 to transmit one MAC TB using each of the conflicting communications resources).

However it may have been previously determined that such transmission (i.e. using each of the conflicting communications resources) is not possible.

In step 918b, the determined communications resources comprise one of the conflicting communications resources. Preferably, the larger of the conflicting communications resources is selected. In some embodiments, such a selection may be restricted to the case where one of the conflicting communications resources was allocated by means of a grant based resource allocation.

In some embodiments, in step 918b, the determined communications resources additionally comprise communications resources which are contiguous with the already-selected communications resources, and extend those communications resources in either the time domain, frequency domain, or both. The selected communications resources are preferably sufficient to provide communications resources for the transmission of a MAC TB formed from the selected data, in accordance with the QoS requirements associated with at least a portion of the selected data.

In some embodiments, therefore, the selected communications resources may comprise communications resources which were not within the conflicting communications resources.

In order to indicate to the infrastructure equipment 101 that additional communications resources have been used, the communications device 104 may in some embodiments transmit, in advance, or substantially simultaneously with, the selected data, an selected communications resource indication which indicates the (extended) selected communications resources. In some embodiments, the selected communications resource indication may indicate those selected communications resources which do not fall within the conflicting communications resources. The selected communications resource indication may comprise an uplink control information (UCI) which may be multiplexed with the PUSCH.

In some other embodiments, no such indication is transmitted by the communications device 104; the infrastructure equipment 101 may thus determine the extent of the selected communications resources without any explicit indication by the communications device 104. For example, the infrastructure equipment 101 may perform blind decoding of candidate communications resources, which may form part of the selected communications resources.

In some embodiments, the conflict of resources may be known in advance (e.g. prior to the availability of data for transmission using the conflicting resources) to both the communications device 104 and the network infrastructure equipment 101. For example, this may be because the periodicities of communications resource instances configured by configured grants are set by the network (e.g. by the infrastructure equipment 101) in advance. In such embodiments, as described above, the identification of the conflict and the selection of communications resources may be carried out prior to the availability of data (and thus prior to the selection of data).

In some embodiments where the conflict of resources may be carried out in advance, then data may be selected shortly before the start of the conflicting resources or resource instances (such as, at a latest time when the data selection step of 710 must be carried out in order to satisfy a constraint on the time required for generating a MAC TB). If only a single MAC TB may be transmitted, then the selected data may be associated with a logical channel having a higher priority.

In some embodiments, remaining data (that is, data which was available for selection when the data selection step was carried out but which was not selected), may be transmitted by the communications device 104 using a next available opportunity. The remaining data may, in some embodiments, be associated with one or more logical channels having a lower logical channel priority than that corresponding to the selected data. The remaining data may, in some embodiments, be associated with the URLLC service.

The next available opportunity could be, for example, a next instance of communications resources configured by a configured grant.

In some embodiments, the next available opportunity may be using communications resources which are dynamically selected, for example in response to determining that remaining URLLC data is available. The dynamically selected communications resources may be selected by the communications device 104, without either configuration or allocation by the infrastructure equipment 101.

In some embodiments, where there is remaining data, the communications device 104 may transmit, using the selected communications resources, an additional data indication which indicates to the infrastructure equipment 101 that the communications device 104 has selected the next available communications resources for a transmission of additional data by the communications device 104. The infrastructure equipment 101 then receives the additional data which is transmitted on the next available communications resources.

In some embodiments, the additional data indication comprises an indication permitting the infrastructure equipment 101 to identify the next available communications resources based on the additional data indication and the predetermined rules.

In some embodiments, the additional data indication does not comprise an indication of the next available communications resources, and the selection of the next available resources is performed in accordance with predetermined rules such that the infrastructure equipment 101 is able to identify the next available communications resources based on the additional data indication and the predetermined rules.

It will be appreciated that the processes illustrated in FIG. 6 and FIG. 8 and described above may be modified or adapted without departing from the scope of the present disclosure. In particular, steps may be added, removed or performed in a different order than shown and described. For example, some steps may be removed because constraints on either the operation of the infrastructure equipment 101 or the operation of the communications device 104 preclude certain scenarios. These constraints may exist from the design or capabilities of the respective equipment/device, by regulatory or standards requirements, or for any other reason.

For example, step 914 may be modified so that if one of the conflicting communications resources is allocated by a dynamic grant and another results from a configured grant having a periodicity greater than or equal to a predetermined threshold, the communications device 104 may determine whether data which would be transmitted on both conflicting communications resources is available sufficiently early for a single MAC TB to be formed from such data (combined) and transmitted using one or both of the conflicting communications resources.

If the communications device 104 determines that the data is available sufficiently early for a single MAC TB to be formed and transmitted using one or both of the conflicting communications resources, then it may do so, instead of selecting as the data only data corresponding to one of the conflicting communications resources.

In some embodiments, where one of the conflicting communications resources is allocated by a dynamic grant and another results from a configured grant, in any determination of communications resources and/or data, the communications device 104 may select the communications resources associated with the configured grant and/or may select the data associated with the configured grant.

In some embodiments, if one of the conflicting communications resources is allocated by a dynamic grant and another results from a configured grant, and some or a portion the communications resources arising from the configured grant is a subset of the communications resources associated with the dynamic grant, then the communications device 104 may transmit data using the communications resources associated with the configured grant. The communications device may further transmit data using the portion of the communications resources associated with the dynamic grant such that no communications resources are used for both of the two transmissions.

Figure 10:
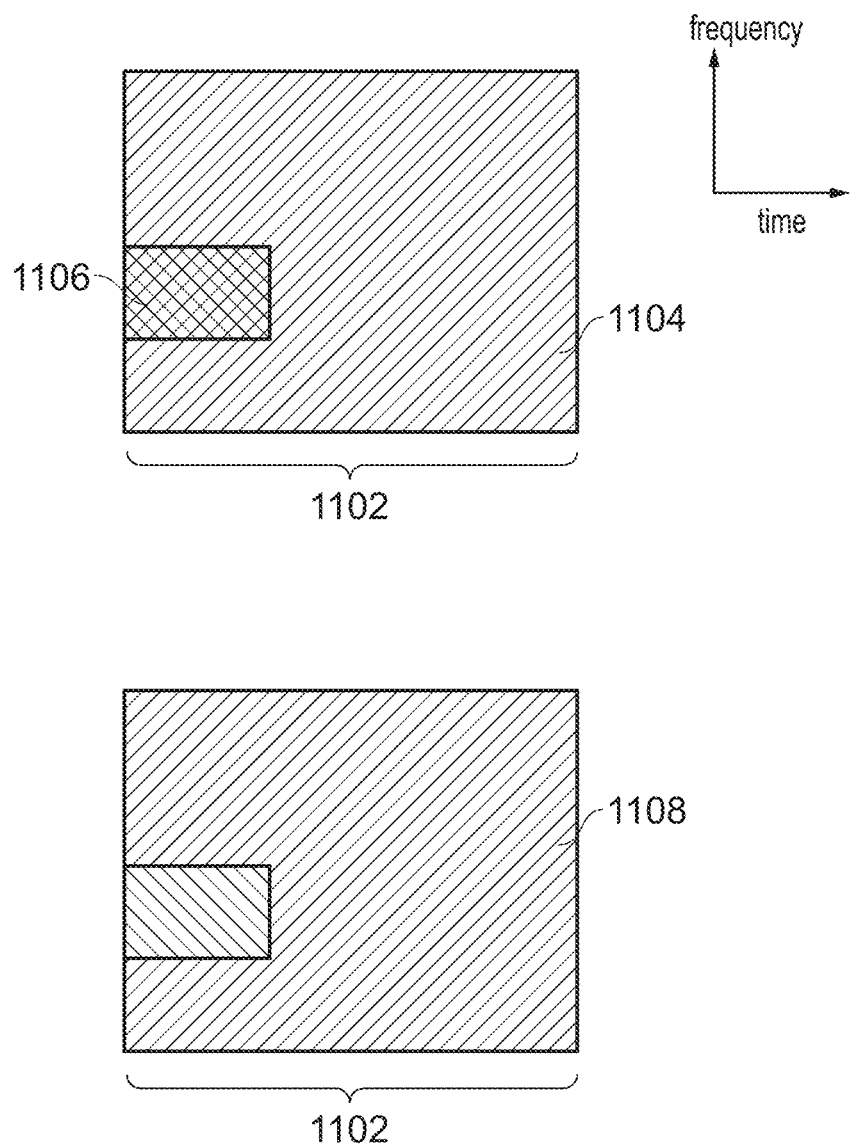
FIG. 10 illustrates a further selection of communications resources in response to determining that a conflict exists, in accordance with embodiments of the present technique.

An example is shown in FIG. 10, which shows first communications resources 1104 (which may have been allocated by means of a DG) and second communications resources 1106 (which may have been allocated by means of a CG). The second communications resources 1106 are, in this example, a subset of the first communications resources 1104.

As shown in the lower portion of FIG. 10, in accordance with some embodiments of the present technique, the second communications resources 1106 may be modified to form modified second communications resources 1108, by excluding that portion of the second communications resources 1106 which overlaps the first communications resources 1104.

According to some embodiments, one MAC TB may be formed for transmission using each of the first communications resources 1104 (comprising data associated with the first communications resource 1104) and the modified second communications resources 1108 (comprising data associated with the second communications resource 1106).

The MCS parameters selected for the transmission of data using the modified second communications resources 1108 may be adapted in order to permit the same amount of data to be transmitted using the modified second communications resources 1108 as would have otherwise (i.e., in the absence of the first communications resources 1104) transmitted using the second communications resources 1104. For example, the rate of puncturing carried out on encoded data may be increased, compared to the rate corresponding to the MCS parameters associated with the (unmodified) second communications resources 1106.

In some embodiments, communications resources may be characterised by MIMO spatial layers, and the data associated with the configured grant may be sent using a first one or more MIMO spatial layers, and the data associated with the dynamic grant may be sent using a second, different, one or more MIMO spatial layers. In such embodiments, it may not be necessary to modify the time and/or frequency ranges of the communications resources.

In some embodiments, the processes for identifying conflicting communications resources, selecting communications resources for the transmission of data, selecting the data (in some embodiments) and selecting MCS parameters (in some embodiments) may be the same, regardless of whether the communications resources were allocated by a DG or a CG. In some embodiments, different processes (e.g. comprising different criteria, or performing different selections) may apply where a conflict exists between communications resources allocated by different CGs that apply where the conflict exists between communications resources allocated by one or more CGs and one or more DGs.

In some scenarios, one or more of the conflicting communications resources may be allocated for the purpose of repeatedly transmitting data. In some embodiments, the repeated transmissions may encode the same data in a different manner (e.g. using different puncturing patterns), to improve the probability that, having received two or more of the repetitions, the receiver will be able to successfully decode the original data.

Thus, in some embodiments of the present technique, the communications device 104 may determine that the conflict may be avoided if one or more of the repetitions are not, in fact, transmitted. In other words, in some embodiments, the selected communications resources may correspond to the conflicting communications resources, excluding one or more portions of one or both of the conflicting communications resources which are used only for repeatedly transmitting data which will be transmitted earlier.

Figure 11:
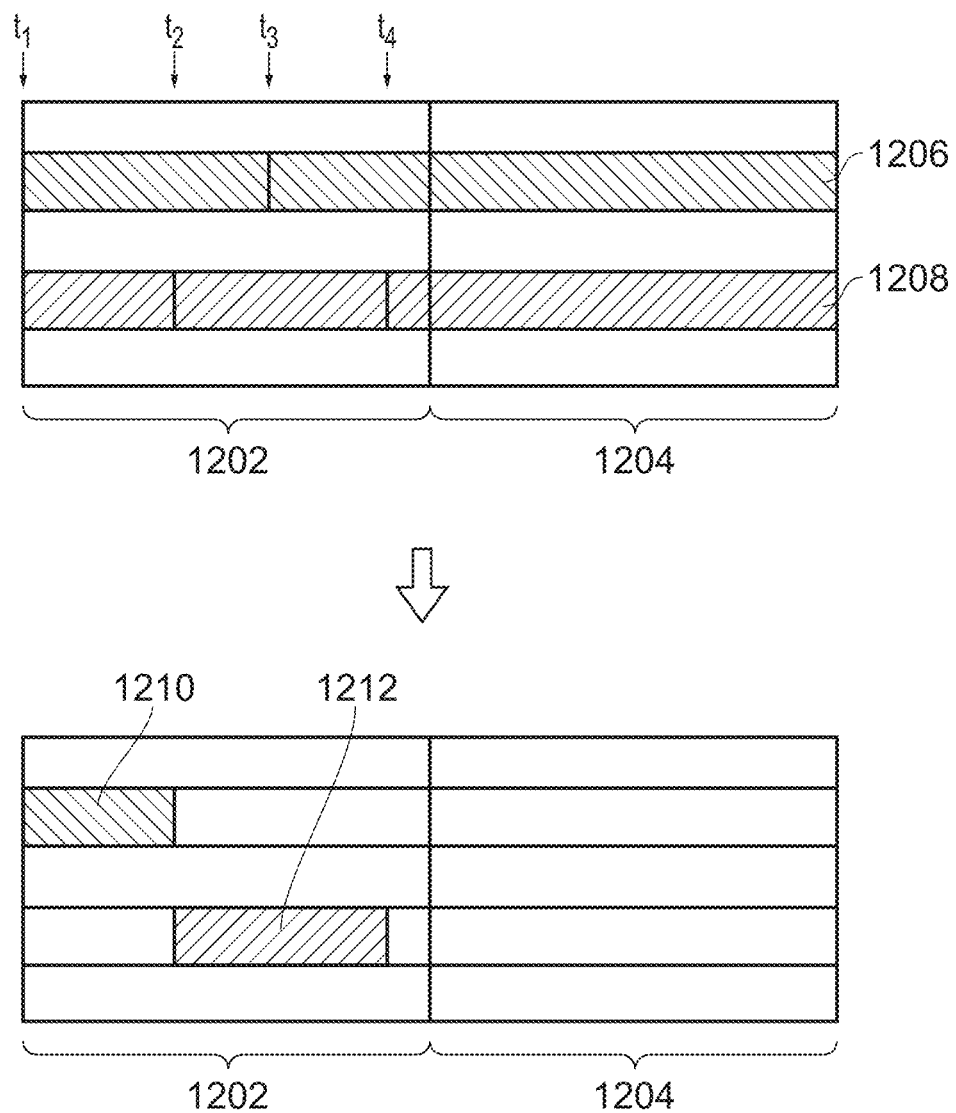
FIG. 11 shows a selection of communications resources where one or more portions of one or both of the conflicting communications resources are for repeatedly transmitting data.

An example of such a selection is shown in FIG. 11.

FIG. 11 shows two timeslots, 1202, 1204 in which first communications resources 1206 and second communications resources 1208 are allocated by means of respective configured grants.

The first communications resources 1206 and second communications resources 1208 permit the transmission of repetitions of the same data. For example, using the first communications resources 1206, an initial transmission may begin at time t1, and four instances of the data may be transmitted between times t1 and t3. Similarly, using the second communications resources 1208, four instances of (different) data may be transmitted between times t2 and t4.

The communications device 104 may determine that it has data to start transmitting at t1, and further data to transmit starting at t3 (which may not be delayed due to, for example, latency constraints associated with the further data), and that the first communications resources 1206 (from t1 to t3) and second communications resources 1208 (from t2 to t4) conflict.

In order to resolve the conflict, then in some embodiments, the communications device 104 may select a subset of the first communications resources 1206 and second communications resources 1208 such that at least one instance of the respective data transmissions may occur. Preferably, the selected subset(s) permit at least the first instance of the repeated transmissions to occur, in order to minimise the latency associated with the data.

As illustrated in the lower portion of FIG. 11, in one example embodiments, the communications device 104 selects as the selected communications resources a portion 1212 comprising all of the second communications resources 1208 (from t2 to t4) because its start time (t2) occurs after the start time of the first communications resources 1206 (t1). Accordingly, to resolve the conflict, the communications device 104 additionally selects a portion 1210 of the first communications resources 1206 from t1 to t2.

In such embodiments, preferably the quantity of data being transmitted is thus unaltered compared to the case where the communications device 104 is able to use both of the conflicting communications resources in their entirety. However, one or more repetitions of the data may not occur, in order to resolve the conflict. In the example of FIG. 11, only two transmissions of the data (one initial transmission plus one subsequent repetition) are possible using the portion 1210 of the first communications resources 1206.

Thus there has been described a method for transmitting data by a communications device, the method comprising determining that a plurality of communications resources overlap, the communications resources being configured for the transmission of data by the communications device, in response to determining that the plurality of communications resources overlap, selecting communications resources comprising at least a portion of one or more of the plurality of communications resources, selecting data to be transmitted using the selected communications resources, and transmitting the selected data using the selected communications resources.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to machine type communication devices/IoT devices or other narrowband communications devices, but can be applied more generally, for example in respect of any type communications device operating with a wireless link to the communication network.

It will further be appreciated that the principles described herein are not applicable only to LTE-based wireless telecommunications systems, but are applicable for any type of wireless telecommunications system that supports a random access procedure comprising an exchange of random access procedure messages between a communications device and a base station.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method for transmitting data by a communications device, the method comprising determining that a plurality of communications resources overlap, the communications resources being configured for the transmission of data by the communications device, in response to determining that the plurality of communications resources overlap, selecting communications resources comprising at least a portion of one or more of the plurality of communications resources, selecting data to be transmitted using the selected communications resources, and transmitting the selected data using the selected communications resources.

Paragraph 2. A method according to paragraph 1, wherein the plurality of communications resources are allocated for the transmission of data by the communications device.

Paragraph 3. A method according to paragraph 1 or paragraph 2, wherein the selecting communications resources is based on a frequency range associated with each of the plurality of communications resources.

Paragraph 4. A method according to any of paragraphs 1 to 3, wherein the selecting communications resources is based on at least one of a starting time and an ending time associated with each of the plurality of communications resources.

Paragraph 5. A method according to any of paragraphs 1 to 4, wherein each of the plurality of communications resources is associated with a latency requirement, and selecting communications resources is based on the latency requirement associated with each of the plurality of communications resources.

Paragraph 6. A method according to any of paragraphs 1 to 5, wherein each of the plurality of communications resources is associated with modulation and coding scheme parameters, and the method comprises selecting modulation and coding scheme parameters, and transmitting the selected data in accordance with the selected modulation and coding scheme parameters.

Paragraph 7. A method according to paragraph 6, wherein selecting the modulation and coding scheme parameters comprises selecting the modulation and coding scheme parameters from the modulation and coding scheme parameters associated with the plurality of communications resources, the selected modulation and coding scheme parameters providing a greatest probability of correct decoding for the transmitted data of the modulation and coding scheme parameters associated with the plurality of communications resources.

Paragraph 8. A method according to paragraph 6, wherein selecting the modulation and coding scheme parameters comprises selecting the modulation and coding scheme parameters from a plurality of predetermined sets of modulation and coding scheme parameters so that the selected data can be transmitted using the selected communications resources.

Paragraph 9. A method according to any of paragraphs 1 to 8, wherein the selecting the data for transmission using the selected communications resources is in response to determining that the plurality of communications resources overlap.

Paragraph 10. A method according to any of paragraphs 1 to 9, wherein each of the plurality of communications resources are for the transmission of a medium access control (MAC) transport block (TB) by the communications device, the selecting communications resources is based on a time required to form a MAC transport block.

Paragraph 11. A method according to any of paragraphs 1 to 10, the method comprising receiving an indication of a configured grant, the configured grant defining a periodic series of communications resources for transmission of data by the communications device, wherein one of the plurality of communications resources comprises one of the periodic series of communications resources defined by the configured grant.

Paragraph 12. A method according to paragraph 11, wherein the selecting the communications resources is based on a periodicity of the periodic series of communications resources defined by the configured grant.

Paragraph 13. A method according to paragraph 11 or paragraph 12, wherein the selecting the communications resources is based on whether one of the plurality of communications resources is allocated by means of a dynamic grant, the dynamic grant made in response to a request for communications resources transmitted by the communications device and granting a single allocation of communications resources.

Paragraph 14. A method according to any of paragraphs 1 to 13, wherein the selected communications resources comprise the plurality of the communications resources.

Paragraph 15. A method according to any of paragraphs 1 to 14, wherein the selected communications resources comprise later communications resources which are not within the plurality of the communications resources.

Paragraph 16. A method according to paragraph 15, wherein the selected communications resources comprise one of the plurality of communications resources which is extended in the time domain.

Paragraph 17. A method according to paragraph 15 or paragraph 16, wherein the selected communications resources comprise one of the plurality of communications resources which is delayed in the time domain.

Paragraph 18. A method according to any of paragraphs 1 to 17, the method comprising transmitting with the selected data using the selected communications resources a selected communications resources indication, the selected communications resources indication indicating the selected communications resources.

Paragraph 19. A method according to any of paragraphs 1 to 18, wherein determining that the plurality of communications resources overlap comprises determining that the plurality of communications resources overlap in a time domain by at least one orthogonal frequency division multiplexing, OFDM, symbol.

Paragraph 20. A method according to any of the paragraphs 1 to 19, the method comprising receiving an indication of a dynamic grant, the dynamic grant allocating a single instance of communications resources for transmission of the data by the communications device, wherein the dynamic grant is transmitted in response to a request for communications resources transmitted by the communications device.

Paragraph 21. A method according to any of paragraphs 1 to 20, the method comprising refraining from transmitting using at least a portion of one or more of the plurality of communications resources.

Paragraph 22. A method according to any of paragraphs 1 to 21, the method comprising determining that additional data not within the selected data is available for transmission and meets predetermined criteria, the predetermined criteria being based on one or more quality of service requirements, transmitting with the selected data using the selected communications resources an additional data indication, the additional data indication indicating that additional data is to be transmitted using next available communications resources, and transmitting the additional data using the next available communications resources.

Paragraph 23. A method according to paragraph 22, wherein the predetermined criteria are satisfied if the additional data is associated with an Ultra Reliable Low Latency Communications, URLLC, service.

Paragraph 24. A method according to paragraph 22 or paragraph 23, wherein the next available communications resources are selected by the communications device.

Paragraph 25. A method according any of paragraphs 22 to 24, wherein the next available communications resources comprise a next one of a periodic series of communications resources defined by a configured grant.

Paragraph 26. A method for receiving data by an infrastructure equipment, the method comprising transmitting to a communications device two or more resource grants, the resource grants comprising an indication of a plurality of communications resources, the plurality communications resources being configured for the transmission of data by the communications device and overlapping, selecting communications resources comprising at least a portion of one or more of the plurality of communications resources, and receiving the data using the selected communications resources.

Paragraph 27. A method according to paragraph 26, wherein the plurality of communications resources are allocated for the transmission of data by the communications device.

Paragraph 28. A method according to any of paragraphs 26 to 27, the method comprising receiving with the selected data a selected communications resources indication, wherein the selecting the communications resources is based on the selected communications resources indication.

Paragraph 29. A method according to any of paragraphs 26 to 28, wherein the selected communications resources comprise communications resources which are not within the plurality of the communications resources.

Paragraph 30. A method according to any of paragraphs 26 to 29, wherein one of the resource grants comprises a dynamic grant, the dynamic grant allocating a single instance of communications resources allocated for transmission of the data by the communications device, and the dynamic grant is transmitted in response to a request for communications resources transmitted by the communications device.

Paragraph 31. A method according to any of paragraphs 26 to 30, wherein one of the resource grants comprises a configured grant, the configured grant allocating a periodic series of communications resources allocated for transmission of data by the communications device, and one of the plurality of allocated communications resources comprises one of the periodic series of communications resources allocated by the configured grant.

Paragraph 32. A method according to any of paragraphs 26 to 31, the method comprising receiving with the selected data using the selected communications resources an additional data indication, the additional data indication indicating that additional data is to be transmitted using next available communications resources, and receiving the additional data using the next available communications resources.

Paragraph 33. A communications device for use in a wireless communications network, the wireless communications network comprising an infrastructure equipment providing a wireless access interface, the communications device comprising a transmitter configured to transmit signals via the wireless access interface, a receiver configured to receive signals, and a controller configured to control the transmitter and the receiver so that the communications device is operable: to determine that a plurality of communications resources overlap, the communications resources being configured for the transmission of data by the communications device, in response to determining that the plurality of communications resources overlap, to select communications resources comprising at least a portion of one or more of the plurality of communications resources, to select data to be transmitted using the selected communications resources, and to transmit the selected data using the selected communications resources.

Paragraph 34. Circuitry for a communications device for use in a wireless communications network, the wireless communications network comprising an infrastructure equipment providing a wireless access interface, the circuitry comprising transmitter circuitry configured to transmit signals via the wireless access interface, receiver circuitry configured to receive signals, and controller circuitry configured to control the transmitter circuitry and the receiver circuitry so that the communications device is operable: to determine that a plurality of communications resources overlap, the communications resources being configured for the transmission of data by the communications device, in response to determining that the plurality of communications resources overlap, to select communications resources comprising at least a portion of one or more of the plurality of communications resources, to select data to be transmitted using the selected communications resources, and to transmit the selected data using the selected communications resources.

Paragraph 35. Infrastructure equipment for use in a wireless communications network, the infrastructure equipment providing a wireless access interface, the infrastructure equipment comprising a transmitter configured to transmit signals to a communications device via the wireless access interface in a cell, a receiver configured to receive signals from the communications device, and a controller, configured to control the transmitter and the receiver so that the infrastructure equipment is operable: to transmit to the communications device two or more resource grants, the resource grants comprising an indication of a plurality of communications resources, the plurality communications resources being configured for the transmission of data by the communications device and overlapping, to select communications resources comprising at least a portion of one or more of the plurality of communications resources, and to receive the data using the selected communications resources.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP TS 38.300 v. 15.2.0 "NR; NR and NG-RAN Overall Description; Stage 2 (Release 15)", June 2018
[2] Holma H. and Toskala A, "LTE for UMTS OFDMA and SC-FDMA based radio access", John Wiley and Sons, 2009
[3] 3GPP TR 38.913, "Study on Scenarios and Requirements for Next Generation Access Technologies (Release 14)".
[4] 3GPP TS 38.214 "NR; Physical layer procedures for data (Release 15)", version 15.3.0
[5] 3GPP TR 38.825
[6] R2-1818991, "LS on multiple active configured grant configurations", RAN2 #104.

What is claimed is:

1. A method for receiving data by an infrastructure equipment, the method comprising:
   transmitting, to a communications device, two or more resource grants comprising an indication of a plurality of communications resources, wherein the plurality of communications resources is configured for transmission of data by the communications device and the plurality of communications resources overlap;
   selecting communications resources comprising at least a portion of one or more of the plurality of communications resources;
   receiving the data using the communications resources selected in the selecting;
   receiving, with the communications resources selected in the selecting, an additional data indication indicating that additional data is to be transmitted using next available communications resources; and
   receiving the additional data using the next available communications resources.

2. The method according to claim 1, wherein the plurality of communications resources are allocated for the transmission of data by the communications device.

3. The method according to claim 1, further comprising:
   receiving, with the communications resources selected in the selecting, a selected communications resources indication, wherein
   the selecting the communications resources is based on the selected communications resources indication.

4. The method according to claim 1, wherein the communications resources selected in the selecting comprise communications resources which are not within the plurality of the communications resources.

5. The method according to claim 1, wherein
   one of the resource grants comprises a dynamic grant,
   the dynamic grant allocates a single instance of communications resources allocated for transmission of the data by the communications device, and
   the dynamic grant is transmitted in response to a request for communications resources transmitted by the communications device.

6. The method according to claim 1, wherein
   one of the resource grants comprises a configured grant,
   the configured grant allocates a periodic series of communications resources allocated for transmission of data by the communications device, and
   one of the plurality of allocated communications resources comprises one of the periodic series of communications resources allocated by the configured grant.

7. A communications device for use in a wireless communications network comprising an infrastructure equipment providing a wireless access interface, the communications device comprising:
   a transmitter configured to transmit signals via the wireless access interface;
   a receiver configured to receive signals; and
   processing circuitry configured to control the transmitter and the receiver so that the communications device is operable to:
      determine that a plurality of communications resources overlap, the communications resources being configured for the transmission of data by the communications device;

in response to a determination that the plurality of communications resources overlap, select communications resources comprising at least a portion of one or more of the plurality of communications resources;

select data to be transmitted using the selected communications resources;

transmit the selected data using the selected communications resources;

transmit, with the communications resources selected by the processing circuitry, an additional data indication indicating that additional data is to be transmitted using next available communications resources; and transmit the additional data using the next available communications resources.

8. Infrastructure equipment for use in a wireless communications network, the infrastructure equipment providing a wireless access interface, the infrastructure equipment comprising:

a transmitter configured to transmit signals to a communications device via the wireless access interface in a cell;

a receiver configured to receive signals from the communications device; and processing circuitry configured to control the transmitter and the receiver so that the infrastructure equipment is operable to:

transmit, to the communications device, two or more resource grants comprising an indication of a plurality of communications resources, wherein the plurality of communications resources is configured for transmission of data by the communications device and the plurality of communications resources overlap;

select communications resources comprising at least a portion of one or more of the plurality of communications resources;

receive the data using the communications resources selected by the processing circuitry;

receive, with the communications resources selected by the processing circuitry, an additional data indication indicating that additional data is to be transmitted using next available communications resources; and receive the additional data using the next available communications resources.

9. The communications device according to claim 7, wherein the plurality of communications resources are allocated by the infrastructure equipment for transmission of the data by the communications device.

10. The communications device according to claim 7, wherein the communications resources selected by the processing circuitry comprise communications resources which are not within the plurality of the communications resources.

11. The communications device according to claim 7, wherein the receiver is further configured to receive, from the infrastructure equipment, two or more resource grants comprising an indication of the plurality of communications resources, and the processing circuitry determines that the plurality of communications resources overlap based on the two or more resource grants.

12. The communications device according to claim 11, wherein one of the resource grants comprises a dynamic grant, the dynamic grant allocates a single instance of communications resources allocated for transmission of the data by the communications device, and the dynamic grant is transmitted in response to a request for communications resources transmitted by the communications device.

13. The communications device according to claim 11, wherein one of the resource grants comprises a configured grant, the configured grant allocates a periodic series of communications resources allocated for transmission of data by the communications device, and one of the plurality of allocated communications resources comprises one of the periodic series of communications resources allocated by the configured grant.

14. The infrastructure equipment according to claim 8, wherein the plurality of communications resources are allocated for the transmission of data by the communications device.

15. The infrastructure equipment according to claim 8, wherein the receiver receives, with the communications resources selected by the processing circuitry, a selected communications resources indication, and the processing circuitry selects the communications resources based on the selected communications resources indication.

16. The infrastructure equipment according to claim 8, wherein the communications resources selected by the processing circuitry comprise communications resources which are not within the plurality of the communications resources.

17. The infrastructure equipment according to claim 8, wherein one of the resource grants comprises a dynamic grant, the dynamic grant allocates a single instance of communications resources allocated for transmission of the data by the communications device, and the dynamic grant is transmitted in response to a request for communications resources transmitted by the communications device.

18. The infrastructure equipment according to claim 8, wherein one of the resource grants comprises a configured grant, the configured grant allocates a periodic series of communications resources allocated for transmission of data by the communications device, and one of the plurality of allocated communications resources comprises one of the periodic series of communications resources allocated by the configured grant.

19. The communications device according to claim 7, wherein each communications resource of the plurality of communications resource is associated with a plurality of modulation and coding scheme parameters.

20. The communications device according to claim 19, wherein the processing circuitry is further configured to select modulation and coding scheme parameters from the plurality of modulation and coding scheme parameters associated with the plurality of communications resources, and the selected data is transmitted using the selected communications resources and in accordance with the selected modulation and coding scheme parameters.

* * * * *